(12) United States Patent
Takano et al.

(10) Patent No.: US 10,416,394 B2
(45) Date of Patent: Sep. 17, 2019

(54) FIBER OPTIC RECEPTACLE WITH INTEGRATED DEVICE THEREIN

(71) Applicant: SENKO Advanced Components, Inc., Marlborough, MA (US)

(72) Inventors: Kazuyoshi Takano, Southborough, MA (US); Siu Kei Ma, Tuen Mun (HK); Kenji Iizumi, Tokyo (JP)

(73) Assignee: senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/979,596

(22) Filed: May 15, 2018

(65) Prior Publication Data

US 2018/0259717 A1    Sep. 13, 2018

Related U.S. Application Data

(63) Continuation-in-part of application No. 15/881,309, filed on Jan. 26, 2018, now Pat. No. 10,185,100.

(60) Provisional application No. 62/658,806, filed on Apr. 17, 2018, provisional application No. 62/581,961, filed on Nov. 6, 2017, provisional application No. 62/546,920, filed on Aug. 17, 2017, provisional application No. 62/452,147, filed on Jan. 30, 2017.

(51) Int. Cl.
*G02B 6/38* (2006.01)

(52) U.S. Cl.
CPC .......... *G02B 6/389* (2013.01); *G02B 6/3825* (2013.01)

(58) Field of Classification Search
CPC .............................. G02B 6/389; G02B 6/3825
USPC ........................................................... 439/79
See application file for complete search history.

(56) References Cited

U.S. PATENT DOCUMENTS

| 4,150,790 A | 4/1979 | Potter |
| 4,327,964 A | 5/1982 | Haesley et al. |
| 4,478,473 A | 10/1984 | Frear |
| 4,762,388 A | 8/1988 | Tanaka et al. |
| 4,764,129 A | 8/1988 | Jones et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Alexander Gilman
(74) *Attorney, Agent, or Firm* — Edward S. Jarmolowicz, Esq.

(57) ABSTRACT

A fiber optic adapter for mating a multi-fiber optic ferrule connector and a multi-fiber optic connector. An engagement device may be integrated or molded as part of adapter receptacle at either end. The engagement device secures the multi-fiber connector. The adapter may be two-piece with a first portion detachable from a second portion, the first portion housing one or more integrated engagement devices and the second portion housing one or more replaceable engagement devices, or a receptacle configured to secure a latch configured on an outer housing of a connector. Receptacle may further contain a plural of engagement devices formed as a unitary engagement device.

14 Claims, 27 Drawing Sheets

(56) References Cited

U.S. PATENT DOCUMENTS

| | | |
|---|---|---|
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 5/1994 | Newman et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,364,537 B1 | 4/2002 | Maynard |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,008,117 B2 * | 3/2006 | Kiani ............... G02B 6/3831 385/58 |
| 7,091,421 B2 | 5/2006 | Kukita et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,114,984 B2 * | 10/2006 | Shirk ............... H01R 13/627 439/372 |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 * | 9/2012 | Lin ............... G02B 6/3825 385/55 |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Junior et al. |
| 8,770,863 B2 | 7/2014 | Cooke et al. |
| 9,188,747 B2 * | 11/2015 | Gniadek ............... G02B 6/3825 |
| 9,411,110 B2 | 8/2016 | Barnette et al. |
| 9,494,744 B2 | 11/2016 | de Jong |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,684,313 B2 | 6/2017 | Cline et al. |
| 9,709,753 B1 | 7/2017 | Chang et al. |
| 10,101,539 B2 * | 10/2018 | Yang ............... G02B 6/262 |
| 2002/0172467 A1 | 11/2002 | Anderson et al. |
| 2003/0053787 A1 | 3/2003 | Lee |
| 2003/0157825 A1 | 8/2003 | Kane |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 * | 3/2008 | Mudd ............... G02B 6/3825 385/75 |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290938 A1 | 11/2009 | Lin et al. |
| 2010/0034502 A1 | 2/2010 | Lu et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |

(56) References Cited

U.S. PATENT DOCUMENTS

| | | |
|---|---|---|
| 2012/0155810 A1 | 6/2012 | Nakagawa |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0259429 A1 | 10/2013 | Czosnowski et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cook et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.
"Fiber Optic Connectors and Assemblies Catalog" 2009, Huber & Suhner Fiver Optics, Herisau, Switzerland, www.hubersuhner.com.
"Fiber Optic Interconnect Solutions, Tactical Fiber Optical Connectors, Cables and Termini" 2006, Glenair, Inc., Glendale, California, www.mps-electronics.de.
"Fiber Optic Products Catalog" Nov. 2007, Tyco Electronics Corporation, Harrisburg, Pennsylvania, www.ampnetconnect.com.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Oct. 9, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Aug. 22, 2015 from related International Application No. PCT/US2015/059458, International Filing Date Nov. 6, 2015.
International Search Report (ISR) WO2008112986 dated Sep. 15, 2009.
ISR WO2014028527ISR dated Feb. 20, 2014.
ISR WO2015US57610ISR dated Jan. 21, 2016.
ISR WO2016176083ISR dated May 19, 2016.

* cited by examiner

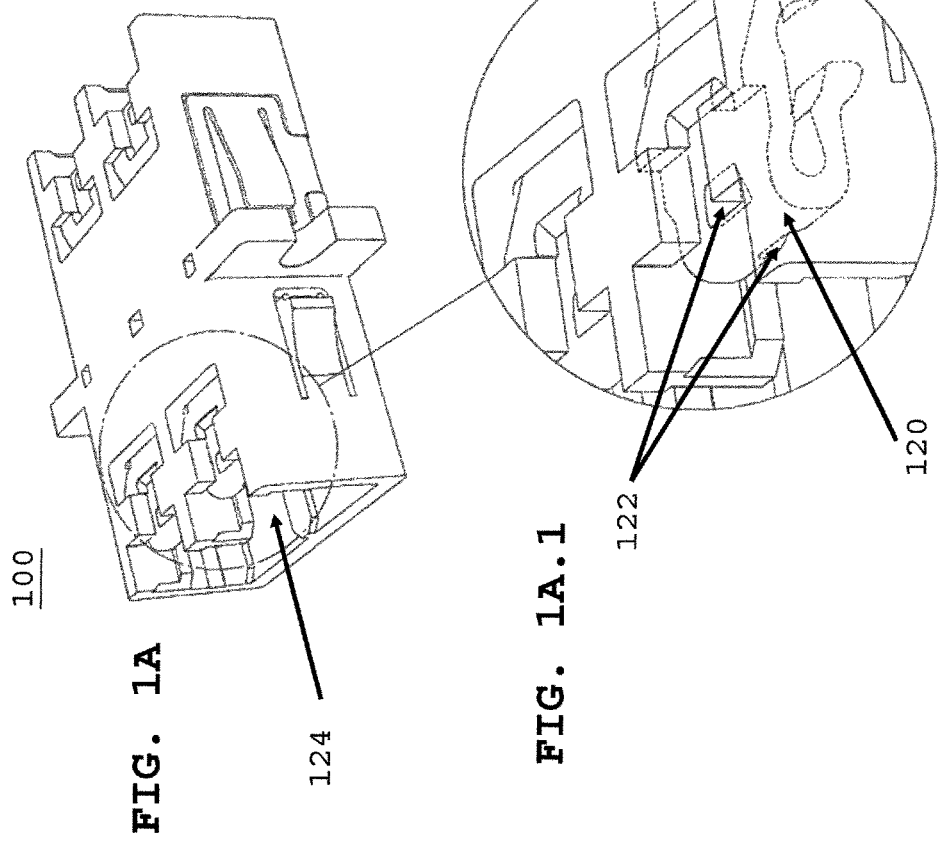
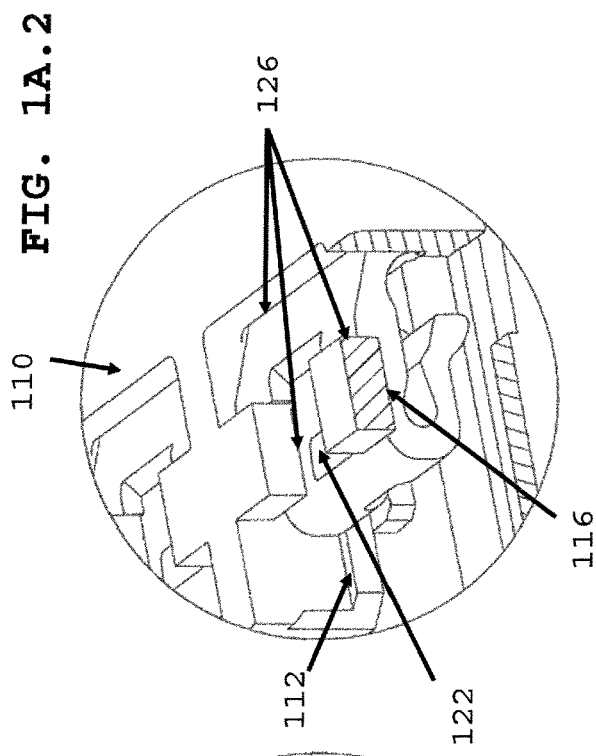

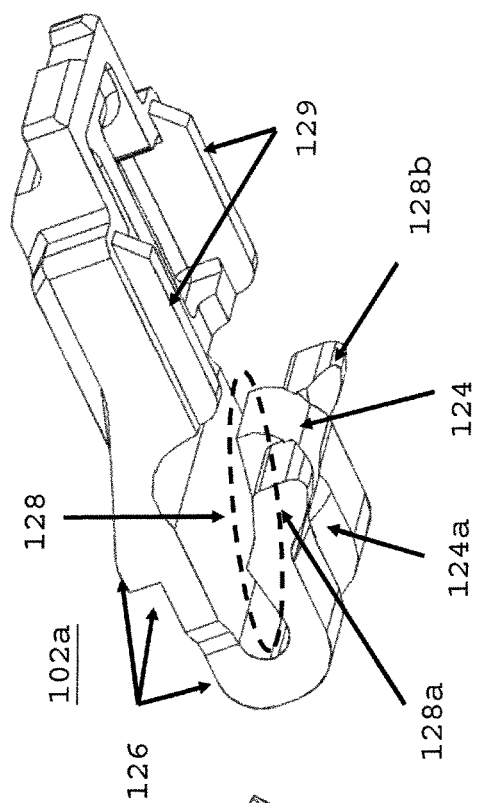
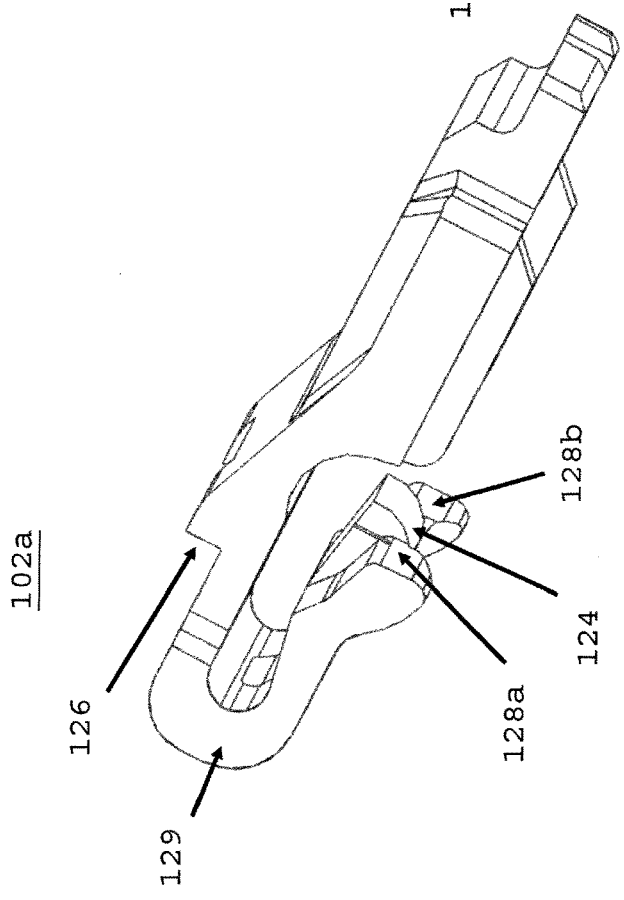
FIG. 1B.2
FIG. 1B.1

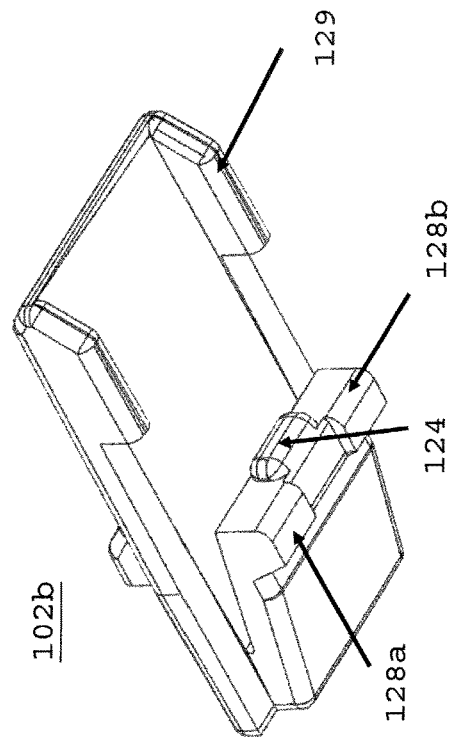
FIG. 1C.2
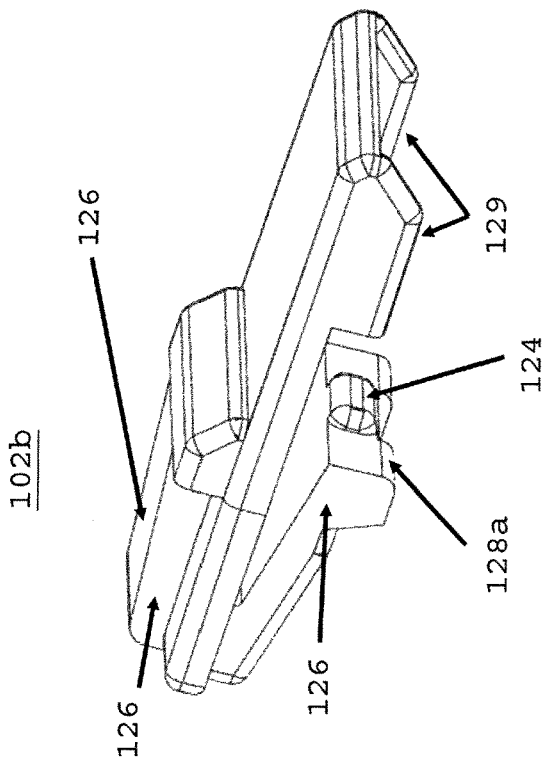
FIG. 1C.1

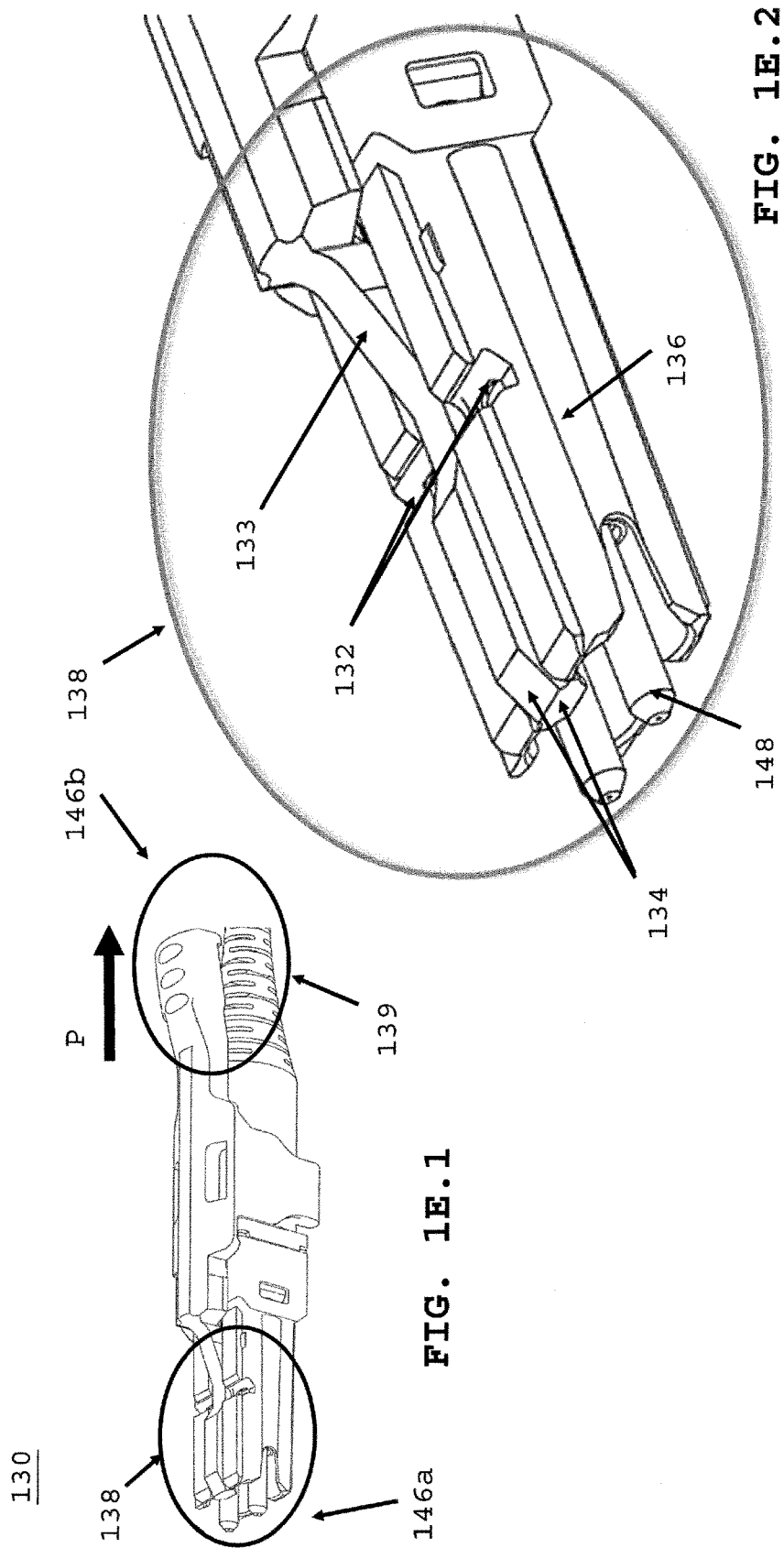

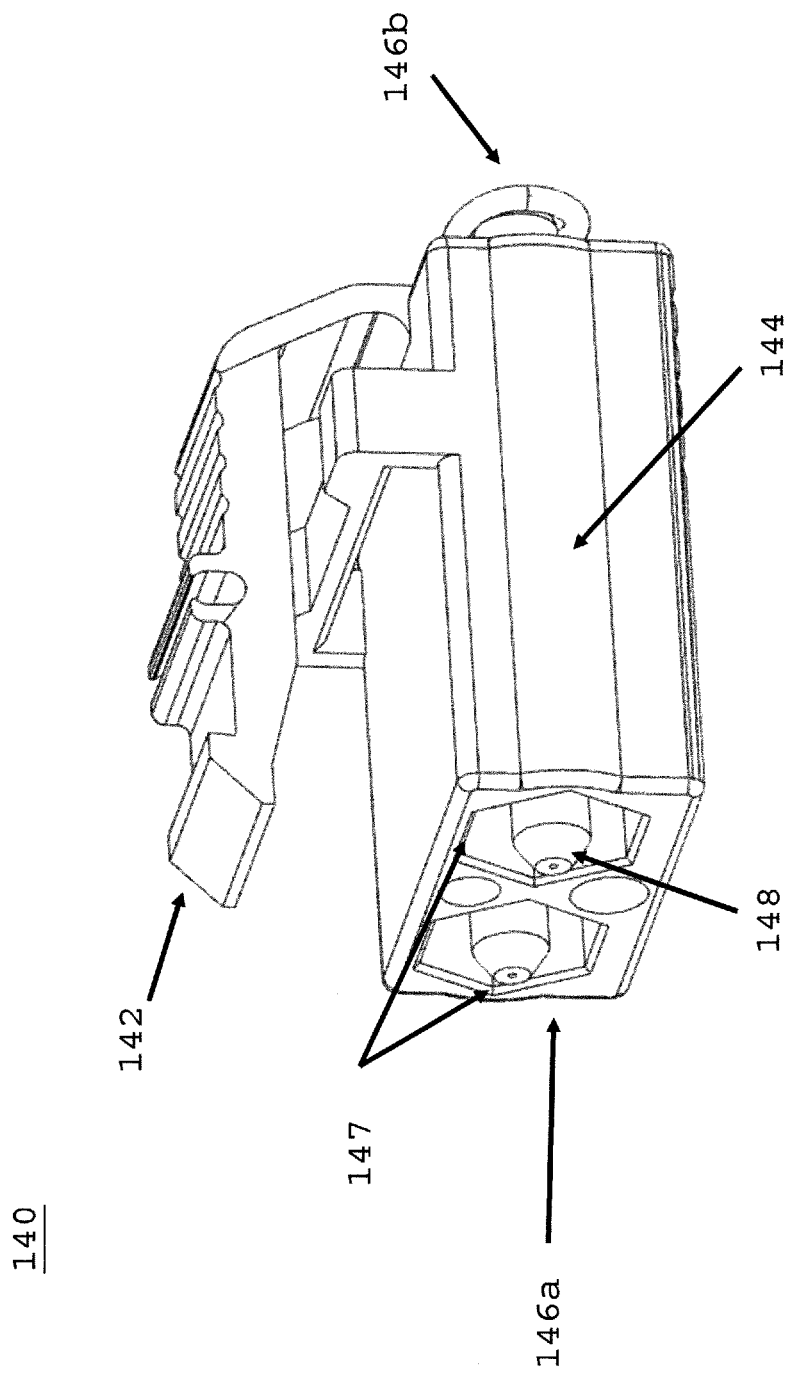

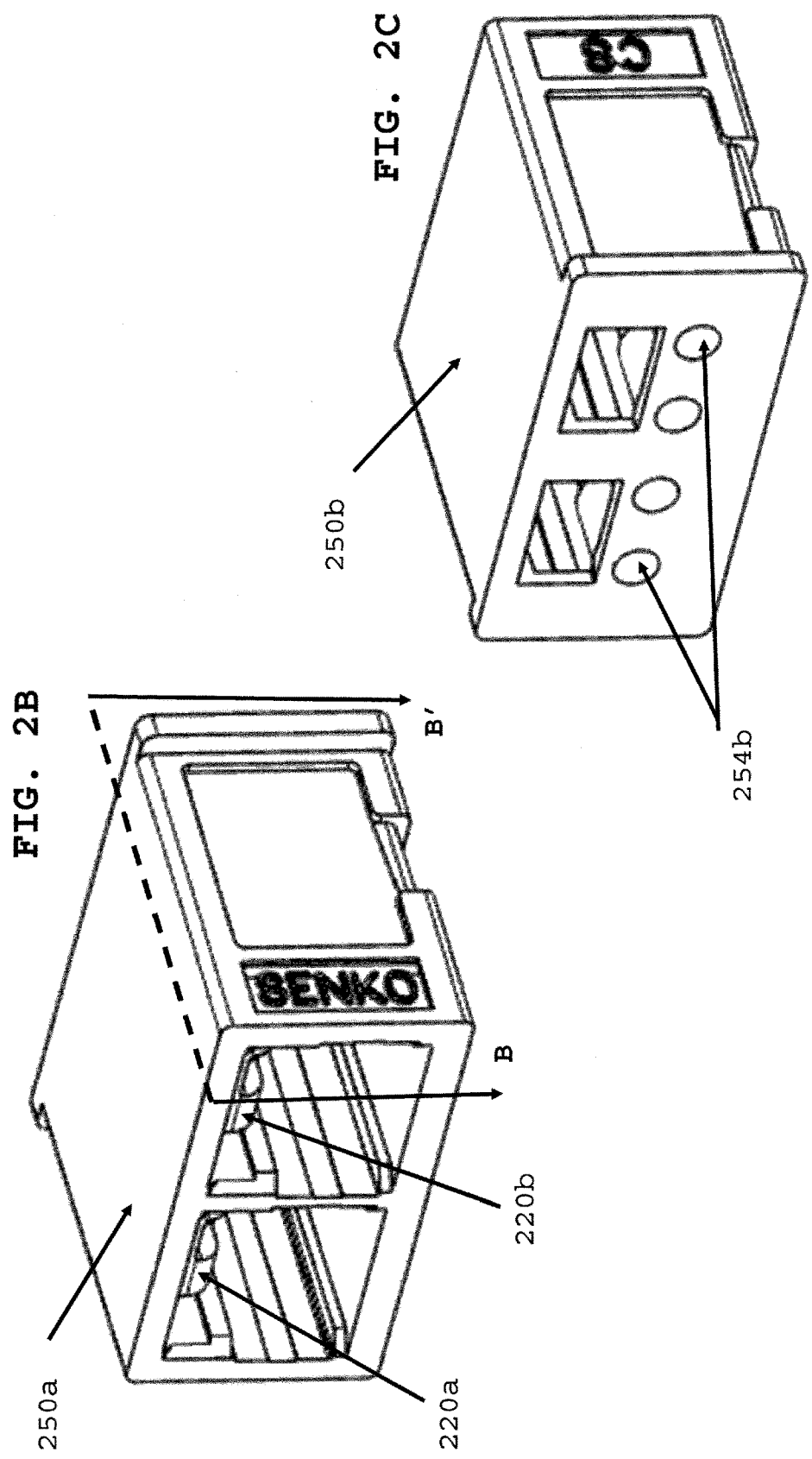

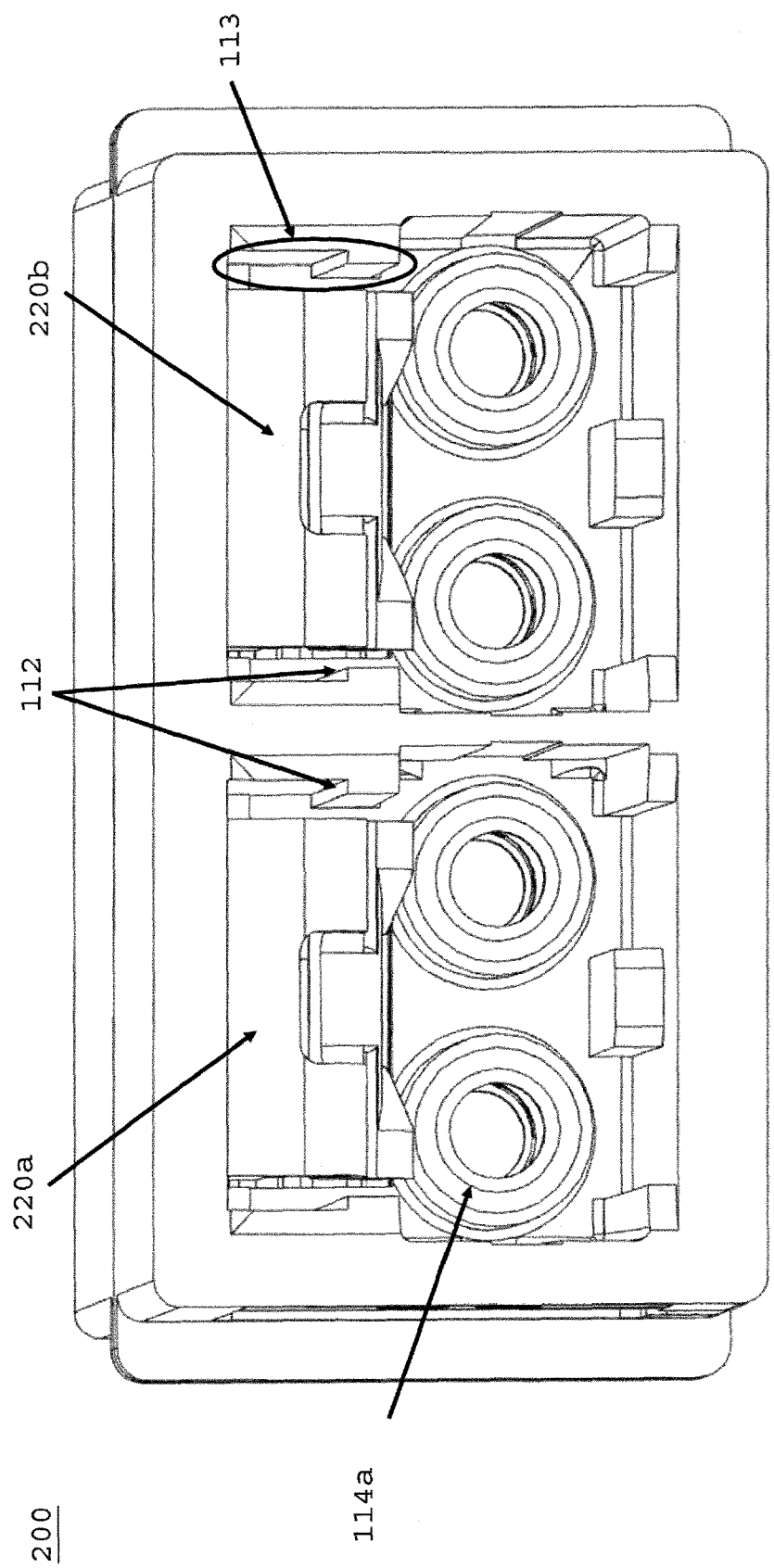
FIG. 2B.1

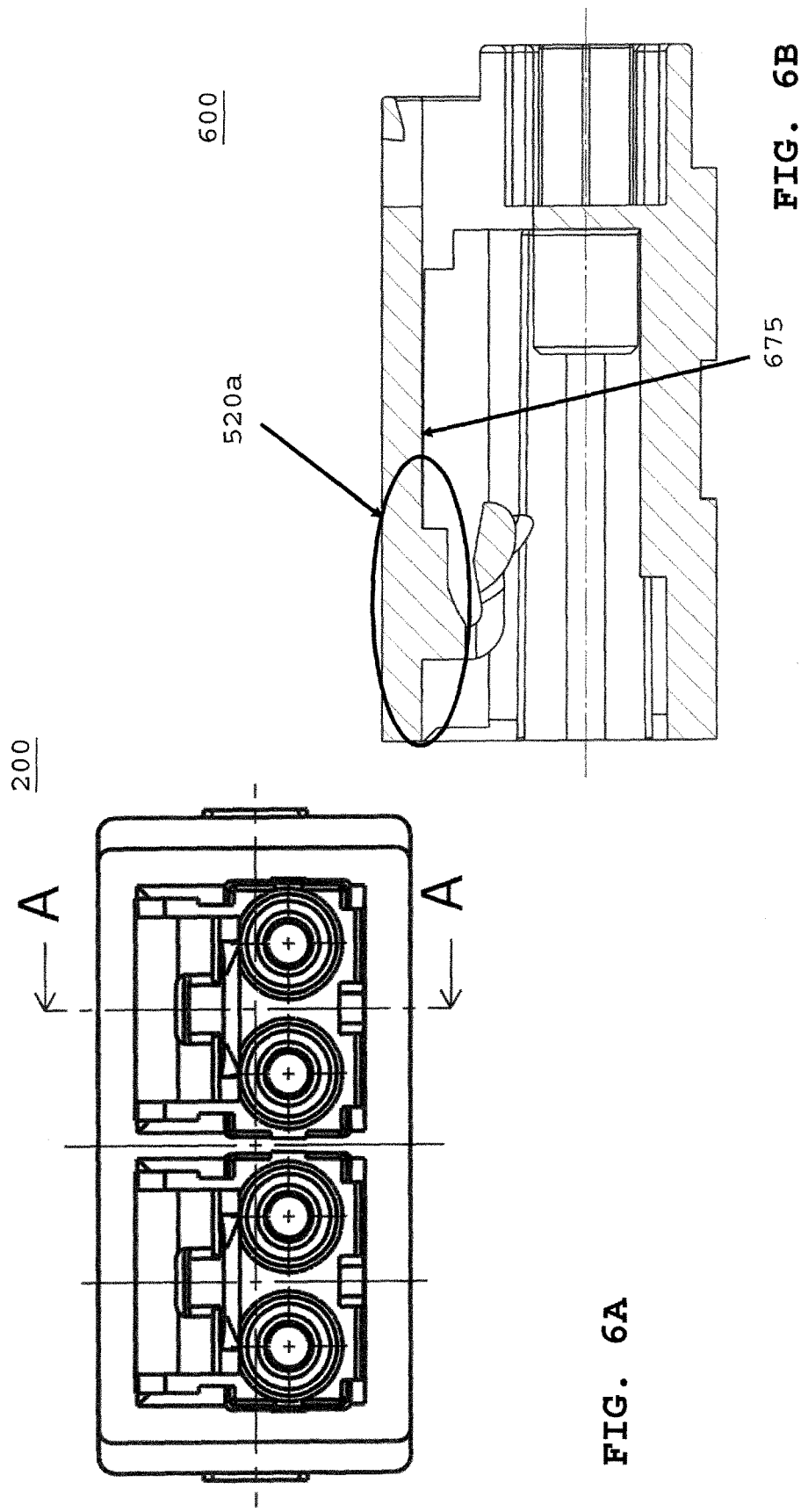

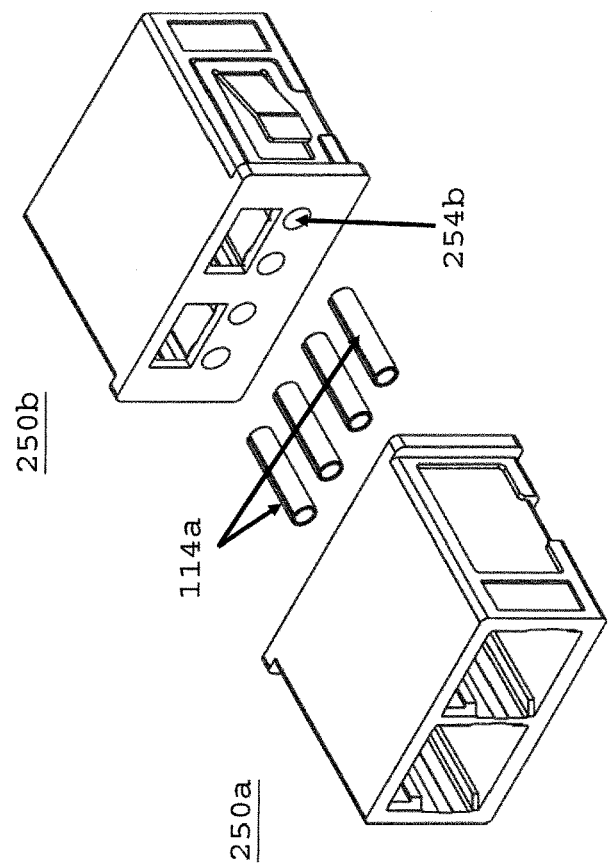
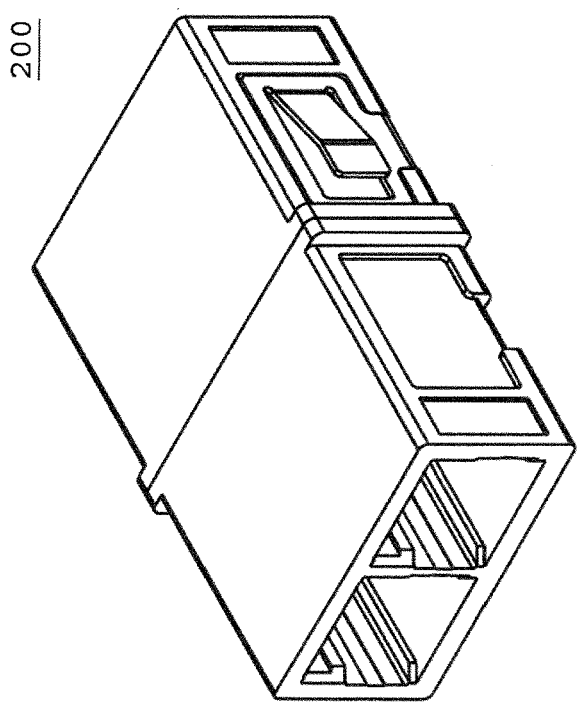

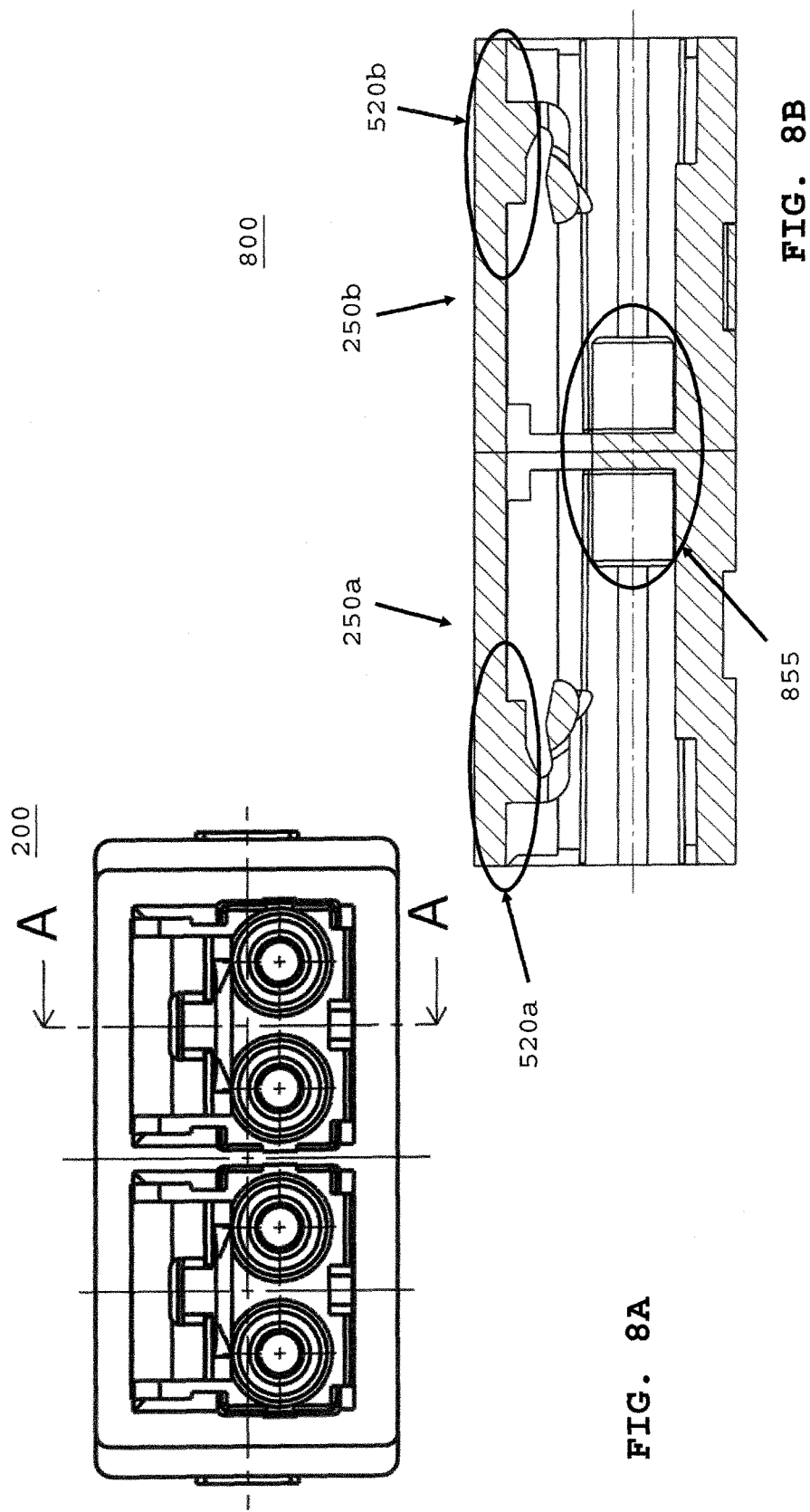

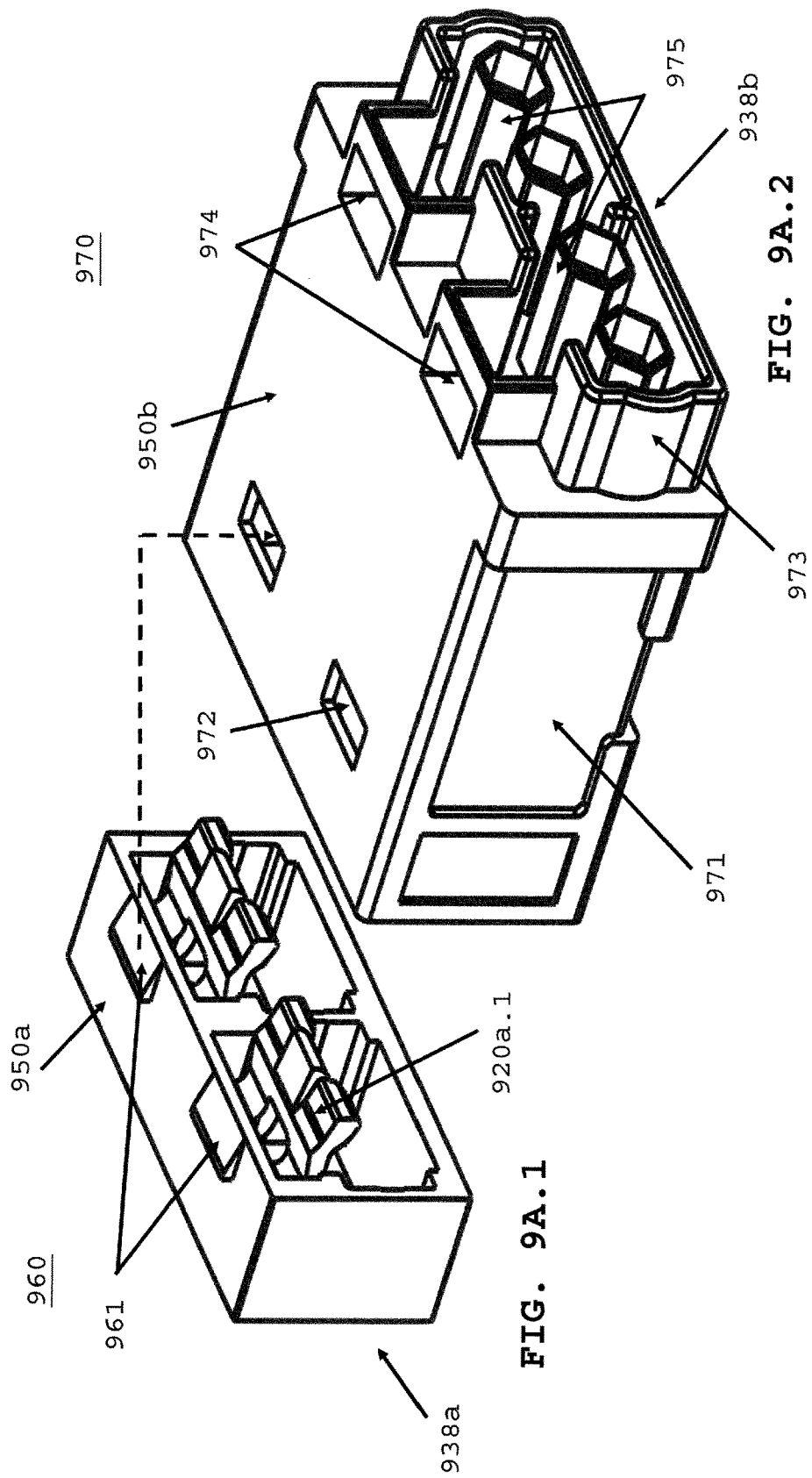

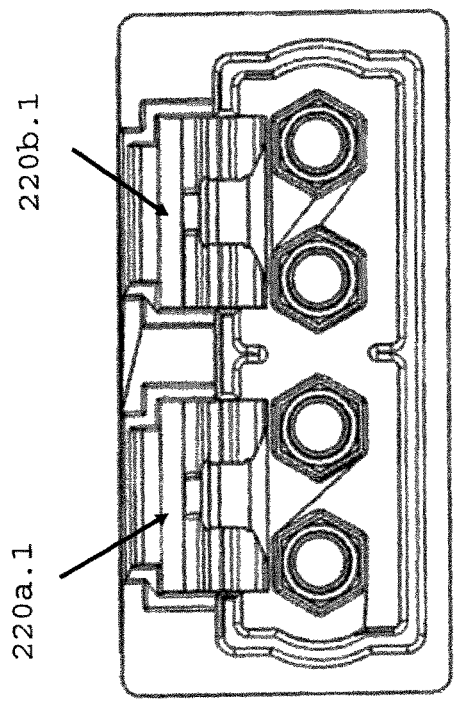
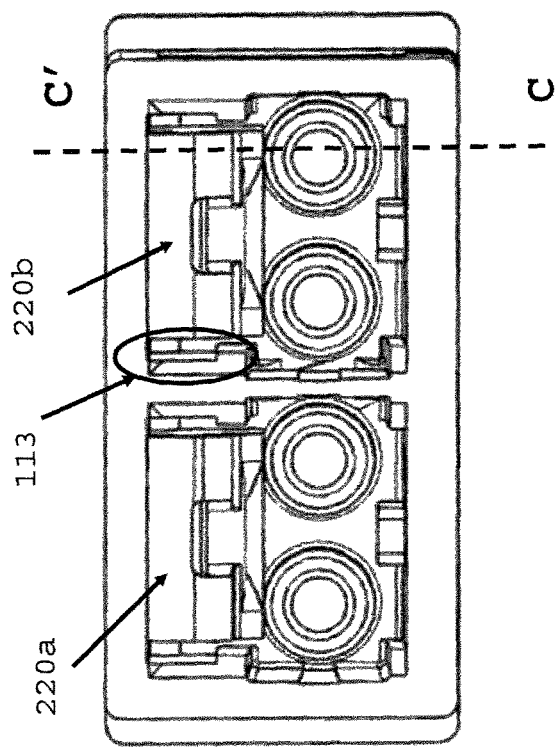
FIG. 11B
FIG. 11A

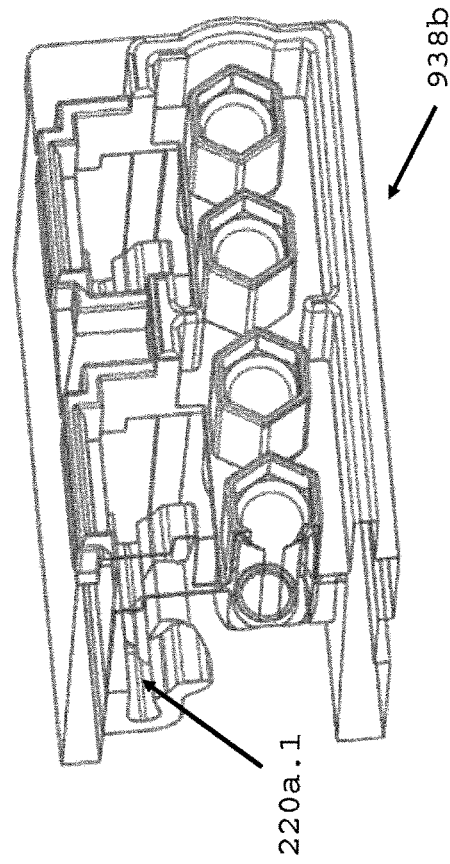
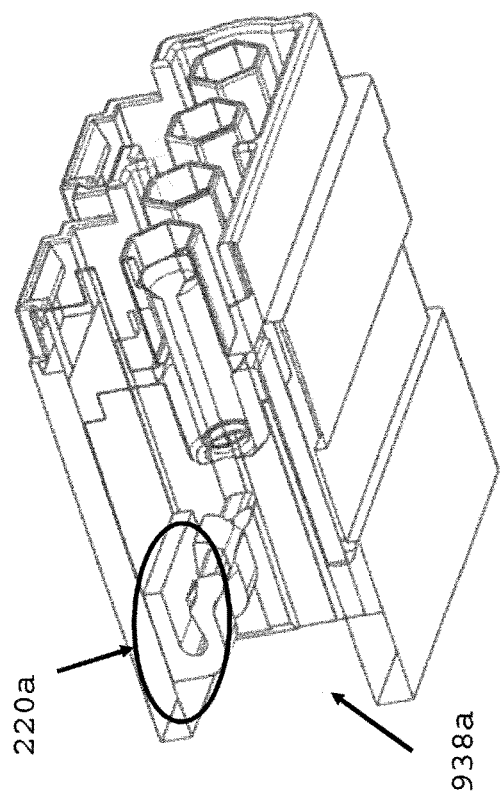
FIG. 13B
FIG. 13A

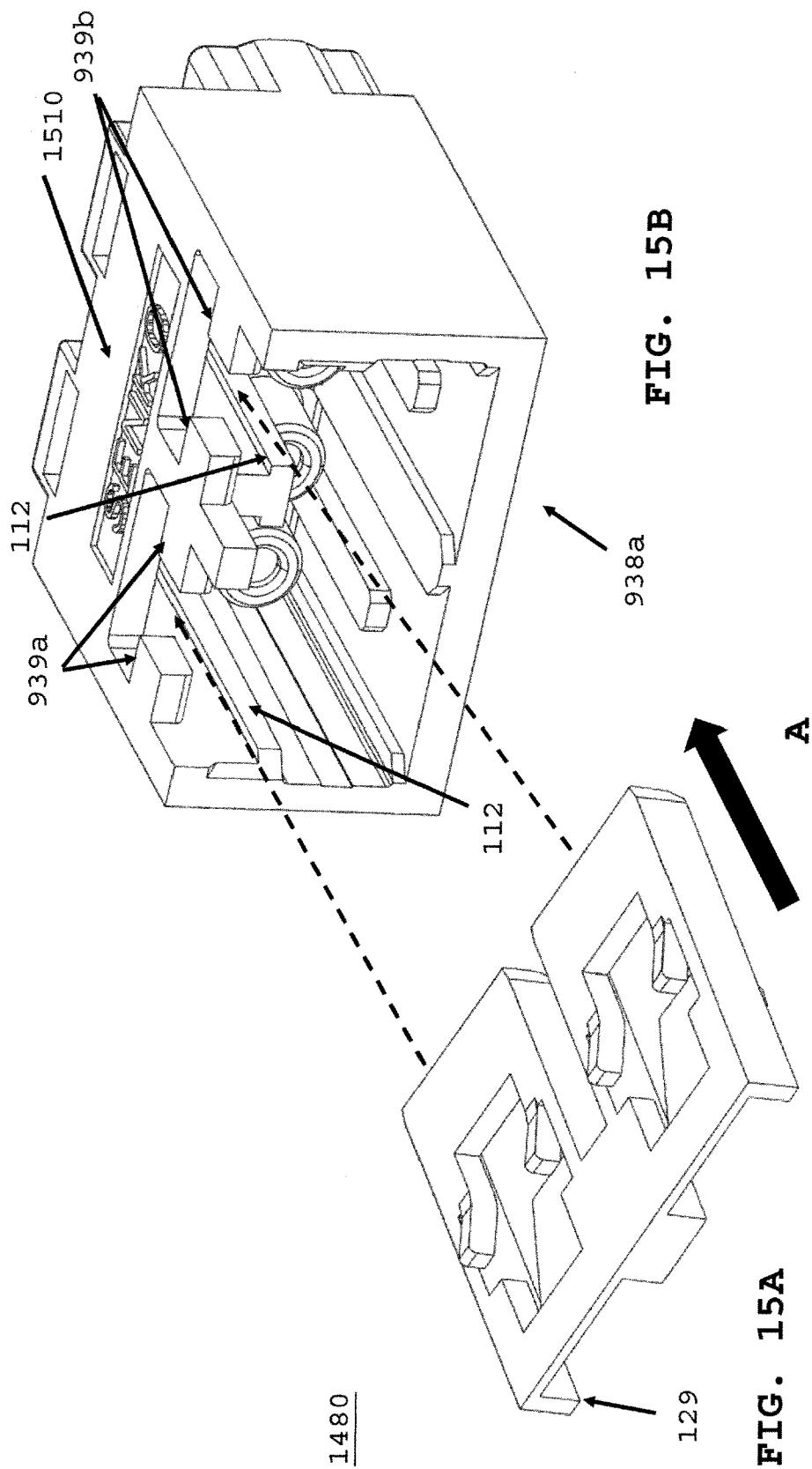

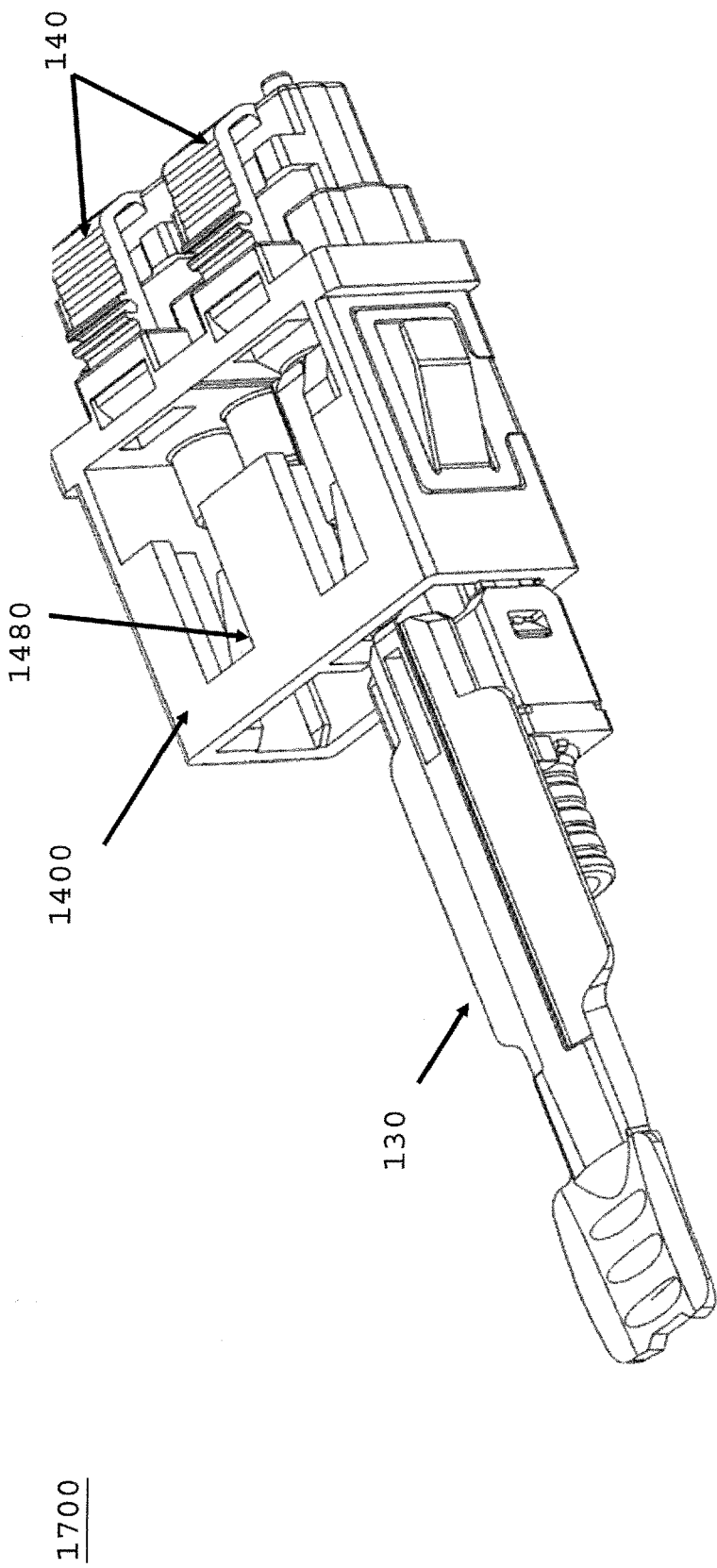

FIBER OPTIC RECEPTACLE WITH INTEGRATED DEVICE THEREIN

CROSS-REFERENCES TO RELATED APPLICATIONS

This application claims the benefit of provisional application 62/658,806 filed on Apr. 17, 2018, under 35 U.S.C. sec. 119(e), and is a continuation-in-part claiming the benefit of U.S. non-Provisional application Ser. No. 15/881,309 filed on Jan. 26, 2018, entitled Modular Connector and Adapter Devices," which claims priority to U.S. Provisional Application No. 62/147,150, filed on Feb. 9, 2017, entitled "Optical Fiber Connector,", and to U.S. Provisional Application No. 62/546,920 filed Aug. 17, 2017, entitled "Narrow Width Adapters and Connectors with Modular Latching Arm,", and to U.S. Provisional Application No. 62/452,147, filed Jan. 30, 2017, entitled "Narrow Width Adapters and Connectors with Modular Latching Arm," and to U.S. Provisional No. 62/581,961 filed Nov. 6, 2017, entitled "Narrow Width Adapters and Connectors with Modular Latching Arm," each of which is incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to fiber optic connectors and adapters, and more particularly, to fiber optic adapters for mating multi-fiber optic ferrule connectors and fiber optic connectors.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a fiber optic adapter for mating a multi-fiber optic ferrule connector at a second end and a multi-fiber optic connector with a push/pull tab at a first end is provided. The fiber optic adapter includes an integrated engagement device within a receptacle at a first end to secure a fiber optic connector therein, and a receptacle at a second end. An opening in second receptacle outer housing secures a latch on an outer housing of the multi-fiber optic ferrule connector. The multi-fiber optic ferrule connector comprises a housing with a plural of ferrules inserted from the front end as opposed to the rear, and the latch secures the ferrules in place, within the housing when the latch is secured in an opening of the housing. Without departing from the scope of the invention, the second receptacle may contain an integrated engagement device.

An integrated or removable, replaceable engagement device has one or more flexible arms that are received and secured in a corresponding widthwise recess at a proximal end of the fiber optic connector. The arms latch the multi-fiber optic connector in place so as to secure the connector inside the receptacle of the adapter. The arms are configured to release the connector when the user pulls on a pull/push tab located at a distal end of the connector. The multi-fiber optic connector's proximal end may have a widthwise recess on a bottom or top surface, while a connector may have recess along a side to engage a similar engagement device.

In an alternative embodiment, the engagement device is molded into adapter housing of each receptacle. In this embodiment, the integrated engagement device is not a removable or replaceable single piece. The integrated engagement device may be ultrasonic welded onto the inner housing of the adapter or similar method to secure device within receptacle. Due to the small size of connectors, adapters and engagement devices, molding the engagement device within the adapter reduces assembly time, breakage, lost parts, and misalignment upon insertion of a connector to be secured by said device. Since each engagement device is configured to correspond to a connector type, inventory and kitting is simplified to an adapter/connector pair.

In an alternative embodiment, an adapter may be two piece comprising a front body portion housing either engagement device, and a second body portion accepting a latch on an outer housing of the multi-fiber optic ferrule connector. The two body portions are secured using existing components such as a plural of alignment sleeves pressfitted within openings in the body, snaps, or clips arranged between the body portions. Any receptacle of the portions may accept either engagement device.

In an alternative embodiment, the adapter may use a unitary or one-piece device with a plural of engagement devices. The unitary device is inserted into an adapter receptacle, and secured therein with a plural of protrusions on the exterior surface of the unitary device that are configured to engage corresponding adapter structure. The protrusions would snap in behind adapter structure and prevent movement of the unitary device upon insertion and release of a fiber optic connector.

In an alternative embodiment, an adapter portion may be preconfigured with an integrated engagement device or a unitary engagement device for each receptacle, and adapter is separable into two portions. This engagement device may be removable/replaceable or molded as one-piece with adapter housing, or a removable/replaceable unitary device with two or more engagement devices depending on the number of adapter receptacles. The proximal end of a connector is closer to a ferrule, while a distal end is closer to a boot or cable holding fiber optic glass that is contained within a ferrule. The fiber optic glass carries the information signal. An adapter has a first end and a second end. An adapter may be a single housing or unitary body.

BRIEF DESCRIPTION OF THE DRAWINGS

Embodiments of the invention are described in more detail hereinafter with reference to the drawings, in which:

FIG. 1A depicts a fiber optic adapter with a plural of receptacles on either side each have a single, releasable and replaceable engagement device therein;

FIG. 1A.1 is a zoomed view of the engagement device inserted into a receptacle of FIG. 1A without a multi-fiber optic ferrule connector secured therein;

FIG. 1A.2 is a zoomed view of the device of FIG. 1A.1 illustrating engagement device secured in a receptacle where the device makes contact and is supported within the adapter structure;

FIG. 1B.1 depicts a side perspective view of a unitary engagement device, that can be secured within adapter receptacle of FIG. 1A.1;

FIG. 1B.2 depicts a bottom, side perspective view of a unitary engagement device that can be secured within adapter receptacle of FIG. 1A.1;

FIG. 1C.1 depicts a side perspective view of another embodiment of a unitary engagement device that can be secured within adapter receptacle of FIG. 1A.1.

FIG. 1C.2 depicts a bottom, side perspective view of another embodiment of a unitary engagement device that can be secured within adapter receptacle of FIG. 1A.1;

FIG. 1E.1 is a perspective of a CS™ multi-fiber optic connector, having a push-pull tab, inserted into an adapter of FIG. 1A using an engagement device;

FIG. 1E.2 is a zoomed view of a proximal end of the multi-fiber optic connector of FIG. 1E.1;

FIG. 1F is a perspective view of a multi-fiber optic ferrule connector that can be secured in an end of the adapter of FIG. 1A without an engagement device;

FIG. 2B is a perspective front angled view of a first portion of a detachable body of adapter of FIG. 2A;

FIG. 2B.1 is a perspective view of a second portion of a detachable body of adapter of FIG. 2A;

FIG. 2C is a perspective view of an assembled adapter of FIG. 2A, having an engagement device integrated into each receptacle of the adapter;

FIG. 6A is a perspective front view of adapter of FIG. 2A with a cross section A-A in a receptacle of the adapter;

FIG. 6B is a cross section view along plane A-A of FIG. 6A without a multi-fiber optic connector of FIG. 1E.1 inserted therein;

FIG. 7A is a perspective view of the adapter of FIG. 2A without integrated engagement device in each adapter receptacle;

FIG. 7B is an exploded view of FIG. 7A;

FIG. 8A is a perspective front view of adapter of FIG. 2A with a cross section A-A at a center-line of receptacle of adapter;

FIG. 8B is a cross section perspective view along plane A-A of FIG. 8A with integrated engagement devices at opposing ends of adapter;

FIG. 9A.1 is a perspective back inside view of a first portion of a multi-body adapter with integrated engagement device in each receptacle;

FIG. 9A.2 is a perspective rear view of a second portion of a multi-body adapter;

FIG. 11A is a front perspective view of a first body portion of the multi-body adapter of FIG. 2A with a cross section plane at C-C';

FIG. 11B is a rear perspective view of a second body portion of the multi-body portion of FIG. 2A;

FIG. 13A is an angled cross-sectional angled rear view along plane C-C' of FIG. 11A;

FIG. 13B is a rear view of cross-sectional view along plane C-C' of FIG. 11A;

FIG. 15A is perspective view of unitary engagement device;

FIG. 15B is a perspective front view of the adapter of FIG. 14 prior to insertion of unitary engagement device of FIG. 15A;

FIG. 17 is a perspective view of the adapter of FIG. 14 with engagement device of FIG. 16 at first end with a multi-fiber optic connector of FIG. 1E.1 inserted at the first end and multi-fiber optic ferrule connector of FIG. 1F at a second end.

DETAILED DESCRIPTION

Figure 1D:
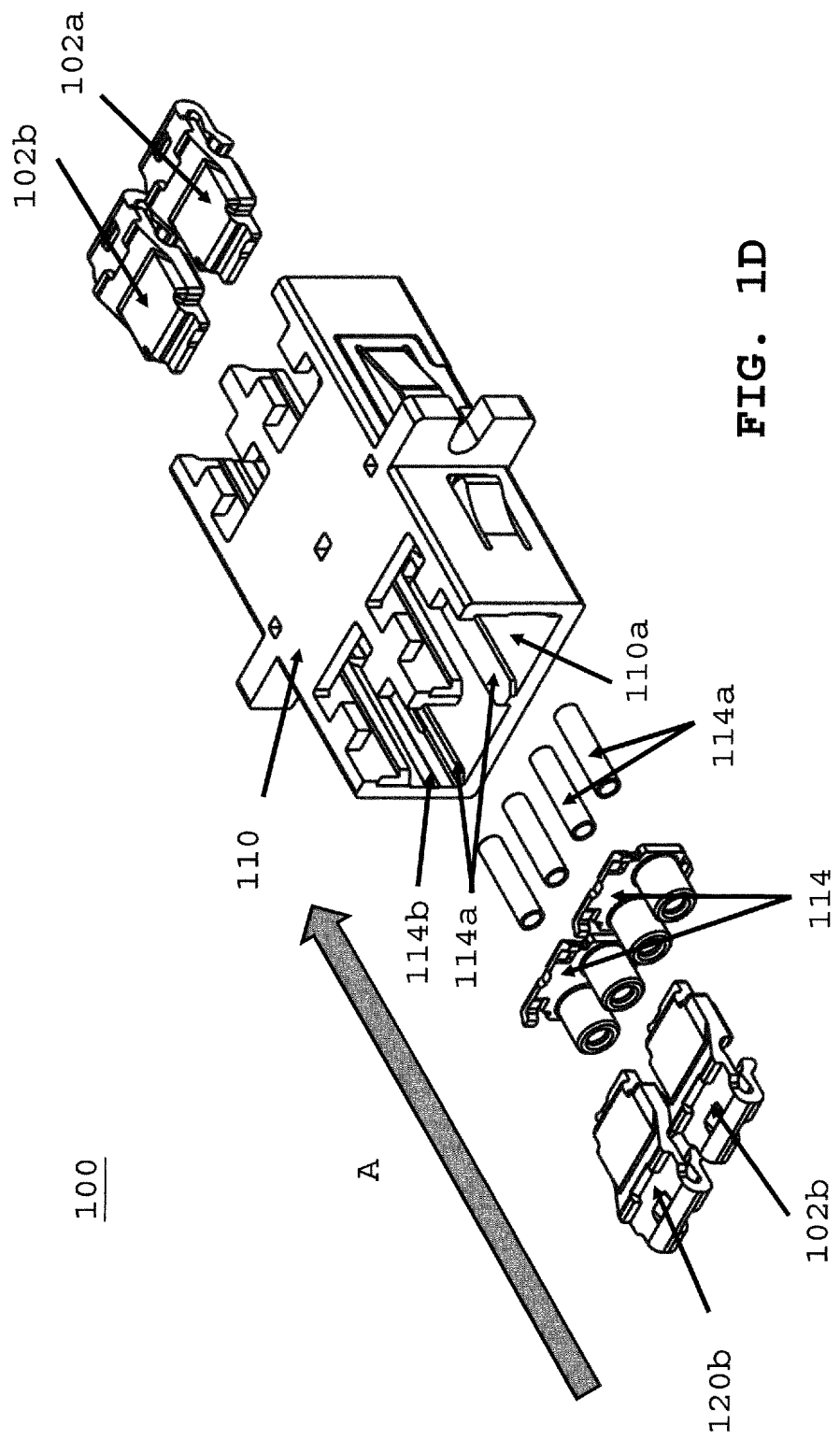
FIG. 1D is an exploded view of FIG. 1A.

In the following description, apparatuses for mating opposing multi-fiber optic connectors of differing types or the same type are set forth as preferred examples. The mating structure includes an engagement device that may be removable/replaceable within a receptacle, or integrated or permanently secure within a receptacle, both devices configure to mate with and secure a proximal end of a fiber optic connector therein. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

FIG. 1A depicts an embodiment of a fiber optic adapter 100 with an engagement device 120 inserted into a receptacle 124 of adapter 100. Referring to FIG. 1A.1, engagement device has openings 122. The openings provide stress relief as the engagement device radius 129 reverses a plural of legs (124, 128a, 128b). A proximal end of connector 130 has a widthwise recess 132, that accepts device legs (128a, 128b). Once the legs are in the recess, an attempt to pull the connector out of the adapter receptacle, the legs are captured in the recess. This capture prevents an unintended removal of connector unless operator pulls on push/pull tab as described herein. The recess is formed is shaped as a groove with a width to accept arm thickness. Upon pulling on the connector, not the push-pull tab, the legs resist removal of the connector. The legs retain a connector by providing an opposing force when positioned within the recess 132.

Referring to FIG. 1A.2, a zoomed portion of adapter outer housing 110 cutouts illustrated contact surfaces that securing points 126 engage with to retain device 120 within an adapter or transceiver receptacle. Cutout 116 on device 120 upper surface receives corresponding adapter housing structure. Referring to FIGS. 1B.1 and 1C.1, the legs (128a, 128b) engage a corresponding widthwise recess 132 on a surface of a proximal end 146a of a push/pull connector 130, as shown as FIG. 1E.2. FIG. 1B.1 depicts an embodiment, 120a, of a removable, replaceable engagement device 120. FIG. 1C.1 depicts another embodiment, 120b, of a removable, replaceable engagement device 120. The aforementioned engagement devices (102a, 102b) are formed as part of receptacle of an adapter in the present invention.

Referring to FIG. 1E.2, the proximal end 146a is nearer a ferrule 148. A distal end 146b is nearer a boot. Referring to FIG. 1A.2, the adapter housing 110 shows an engagement device 120 inserted into a receptacle. The cross-section depicts engagement device securing points 126 that engage adapter housing to prevent movement upon inserting and removing a connector (not shown). Referring to FIGS. 1B.1-1C.1, engagement device securing points 126 engage opposing surfaces from within adapter receptacle housing to secure engagement device therein as shown. Referring to FIG. 1B.2 and FIG. 1C.2, rails 129 are supported on an inner rail support 112 within adapter receptacle 124.

Referring to FIG. 1E.1, a push/pull multi-fiber optic connector 130, with tab 139, allows a user to release connector from receptacle by pulling on tab 139 in direction "P". To secure connector in a receptacle, engagement device (102a, 102b) is activated upon insertion of a proximal end of the connector into the receptacle. Referring to FIG. 1B.1, middle arm 124 contacts ramp 134 (refer to FIG. 1E.2), as middle arm is raised a pair of outer arms (128a, 128b) are raised. As connector is further inserted into receptacle, outer arm tension is released and outer arms drop into are retained within a widthwise recess 132 at a proximal end of connector. This secures or latches connector into adapter receptacle. Once secured, engagement device prevents longitudinal movement of a multi-fiber optic connector along longitudinal axis, from a first end to a second end of fiber optic adapter 100 inside a receptacle. This is the same operation for device 102a, FIG. 1B.1 and also occurs for device 120b, FIG. 1C.1.

Figure 4:
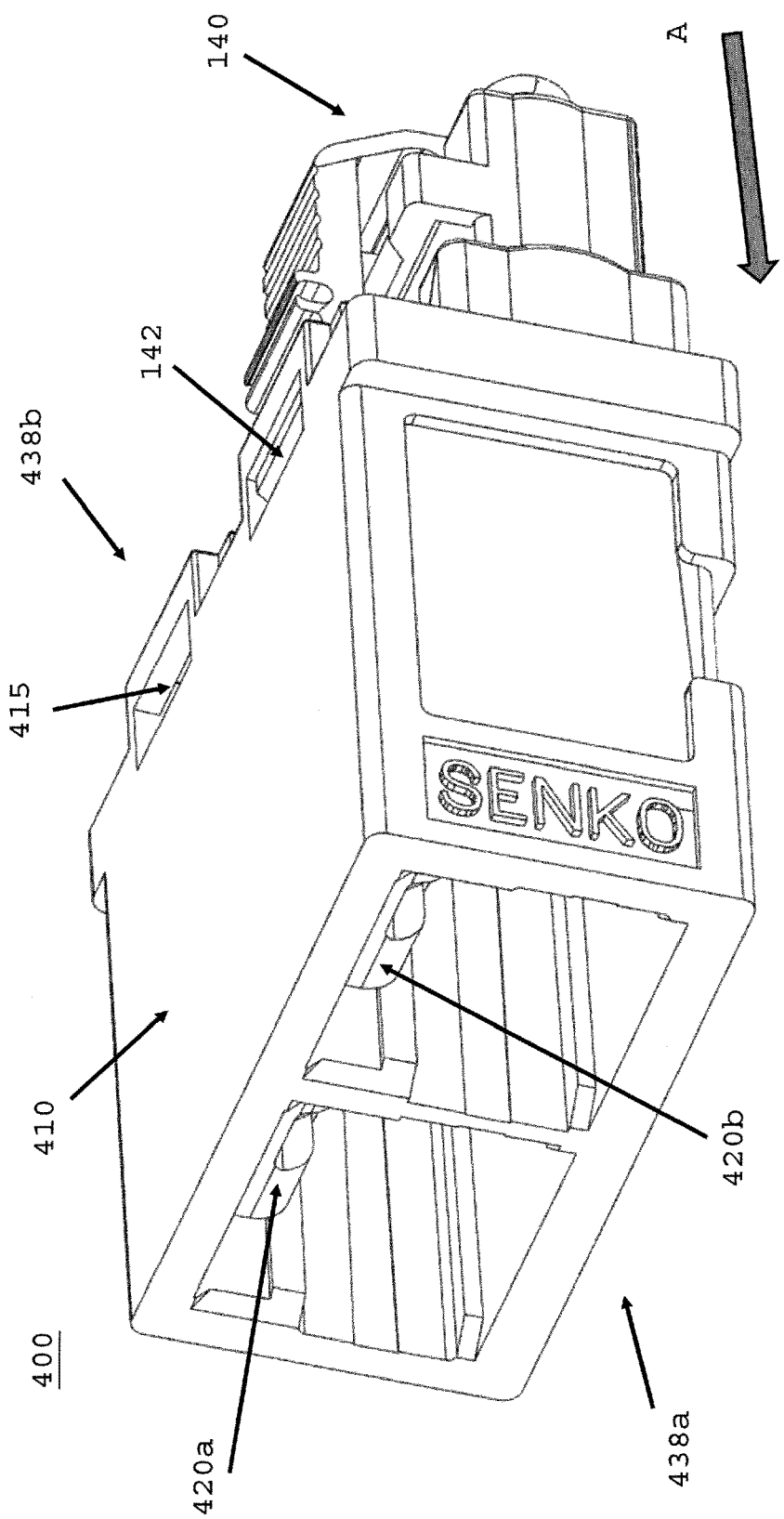
FIG. 4 is a side perspective view of adapter of FIG. 2A with the multi-fiber optic ferrule connector of FIG. 1F inserted at a second end in direction of arrow "A"

FIG. 1F depicts a perspective view of an alternative fiber optic connector 140. Connector 140 is inserted in a second end of adapter 100 without an engagement device 120. Referring to FIGS. 1F and 4, a latch 142 is depressed and seats within an adapter housing opening 415 to secure connector 140 in adapter receptacle. Referring to FIG. 1F, connector housing 144 mates with a shroud 973 of FIG. 9A.2, to align connector 140 into adapter receptacle that allows latch 142 to be secured within opening 974.

Referring to FIG. 1D, the adapter 100 is assembled in the direction of arrow "A". Alignment sleeves 114a are inserted into adapter housing between a first and a second end. An alignment sleeve holder 114 accepts one end of alignment sleeve, and alignment sleeve holder 114 is secured within corresponding adapter structure in housing 110. The integrated engagement devices (120a, 120b) are molded as one integrated piece into an adapter receptacle inner housing structure. Without departing from the scope of the invention, integrated engagement device may be secured to any surface of an adapter housing. The replaceable engagement devices (102a, 102b) are configured with outer structure (e.g. securing points 126) to secure within corresponding adapter housing structure.

Figure 2A:
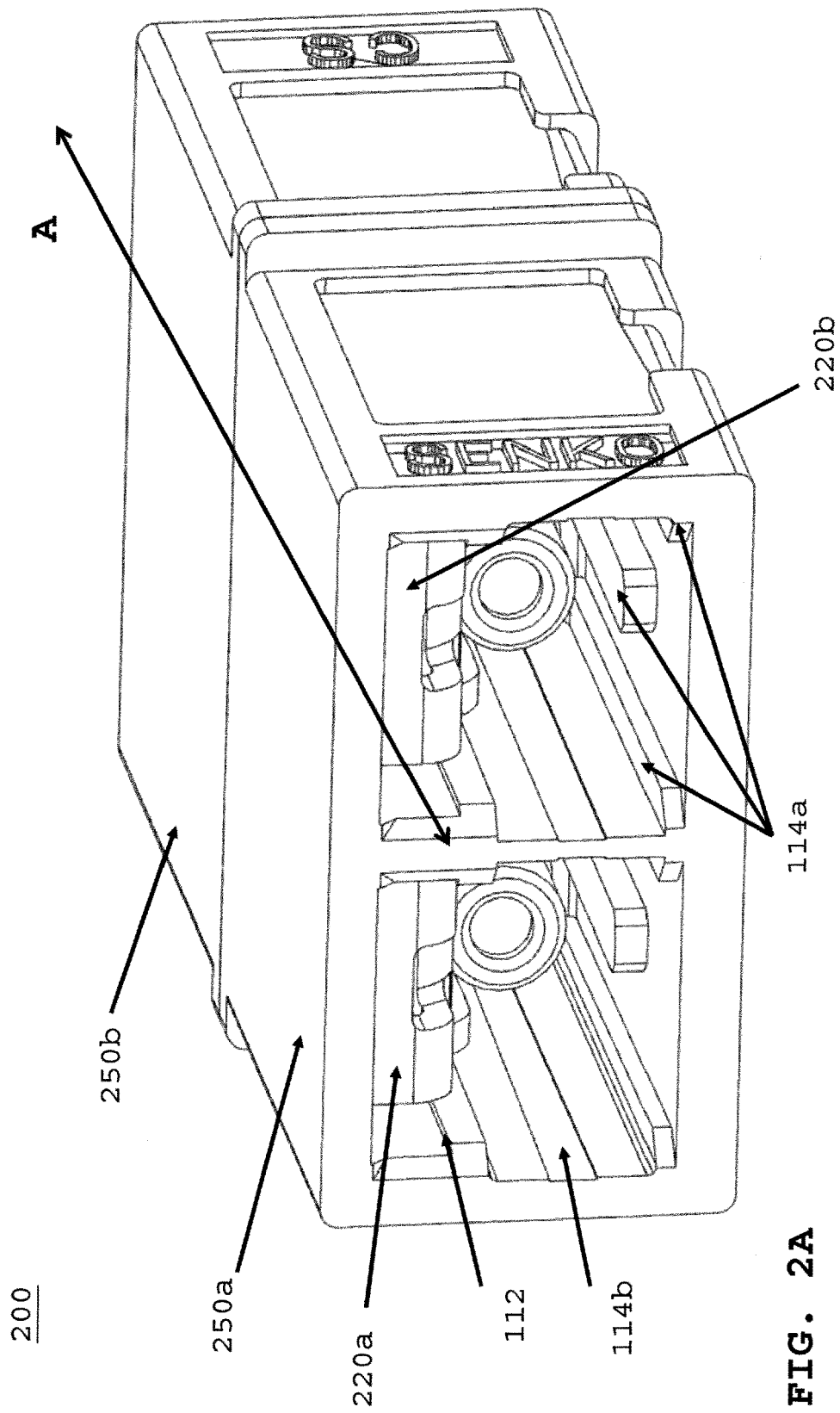
FIG. 2A is a front perspective view of an embodiment of an adapter having an integrated engagement device in a receptacle.

FIG. 2A shows an alternative adapter 200 that comprises a first body portion 250a and a second body portion 250b. Referring to FIG. 2B, the first body portion comprises an engagement device 220a, 220b respectively in each receptacle at a first end. Referring to FIG. 2C, the second body portion 250b comprises a plural of alignment sleeve openings 254b at a first end. Openings 254b accept a corresponding alignment sleeve 114a (refer to FIG. 1D). Referring to FIG. 7B, the sleeve 114a at a first end engages an opening at a second end of first body portion 250a. Upon pushing together first and second body portion, a plural of alignment sleeves 114a secure the body portions together to form adapter 200, as shown in FIG. 7A.

Referring FIG. 2A, the adapter 200 comprises a front portion 250a and a back portion 250b, each adapter opening or receptacle includes an engagement device (220a, 220b), the opening further comprises a plural of rails 114a and a channel 114b that mate with corresponding structure at an outer housing 136 (FIG. 1E.2) of connector 130. The receptacle further includes a rail support 112 that accepts a guide rail 129 (refer to FIG. 1C.1 or FIG. 1B.1) located on an engagement device 102a, 102b. Referring to FIG. 2B, cross section B-B' is shown in FIG. 5A and FIG. 5B.

Referring to FIG. 2B.1, a front view of adapter 200 shows the engagement device 220a, 220b integrated with adapter inner housing 675 (FIG. 6B). Integrated device 220a, 220b does not use support rails 112. Neither engagement devices (220a, 220b) occupy the same space as replaceable version used within adapter 100. Integrating an engagement device reduces any longitudinal movement of the ferrules, which reduces signal loss, reduces engagement device breakage, reduces manufacturing costs because it is a one-piece design, and helps ensure alignment of connector 130 within receptacle. Adapters and transceiver receptacles are becoming more compact and smaller, and molding one-piece devices is critical to this success.

Figure 3:
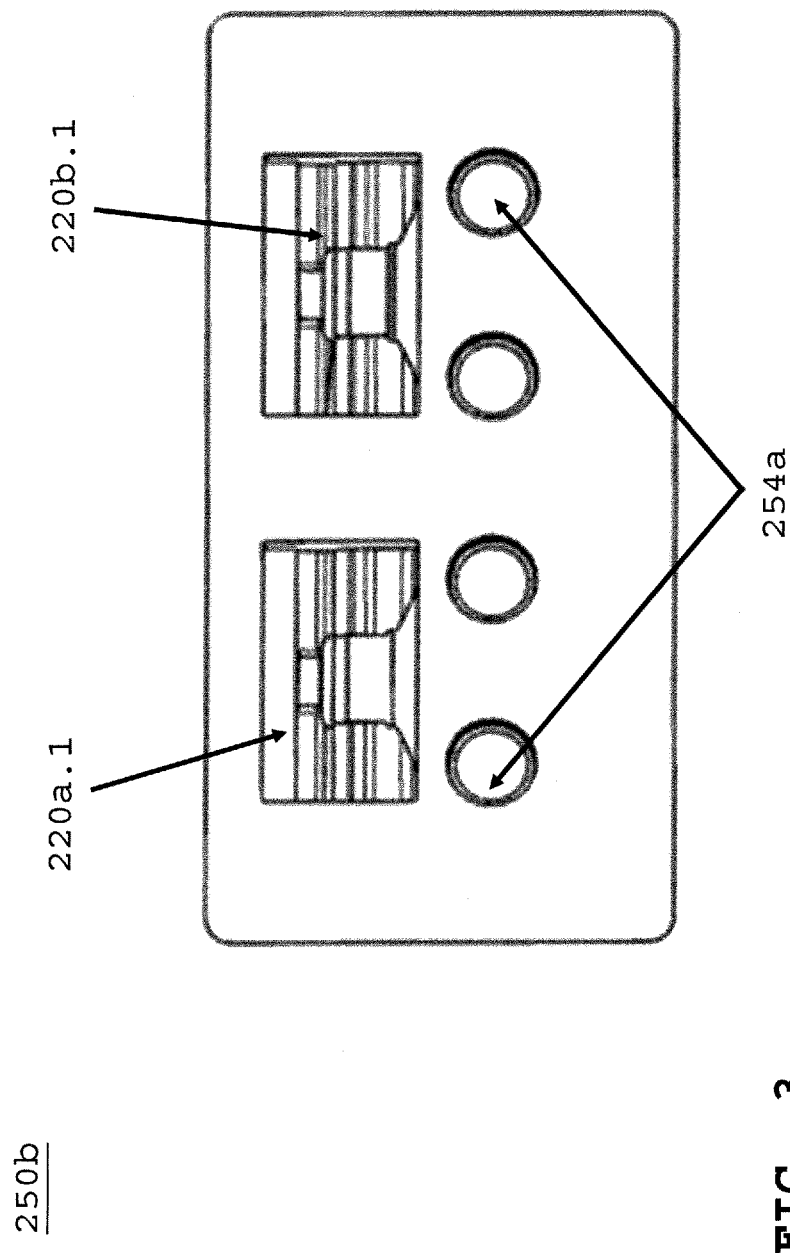
FIG. 3 is front view of the second portion of FIG. 2C after detached from a first body portion.

FIG. 3 shows a plural of alignment sleeve openings 254a that accept a corresponding alignment sleeve which connect the two body portions together. A rear view of engagement devices (220a.1, 220b.1) are shown in an adapter receptacle of the second body portion 250b. FIG. 4 comprises integrated engagement device in each receptacle at first end 438a, and connector 140 inserted at second end 438b of single body adapter. A first end 938a receptacle can accept connector 130. A second end 938b receptacle can accept second connector 140 inserted in direction of arrow "A". The adapter housing 410 has an opening 415 that accepts latch 142 located at outer housing of connector 140. The integrated engagement devices (420a, 420b) can accept connector 130.

Figure 5A:
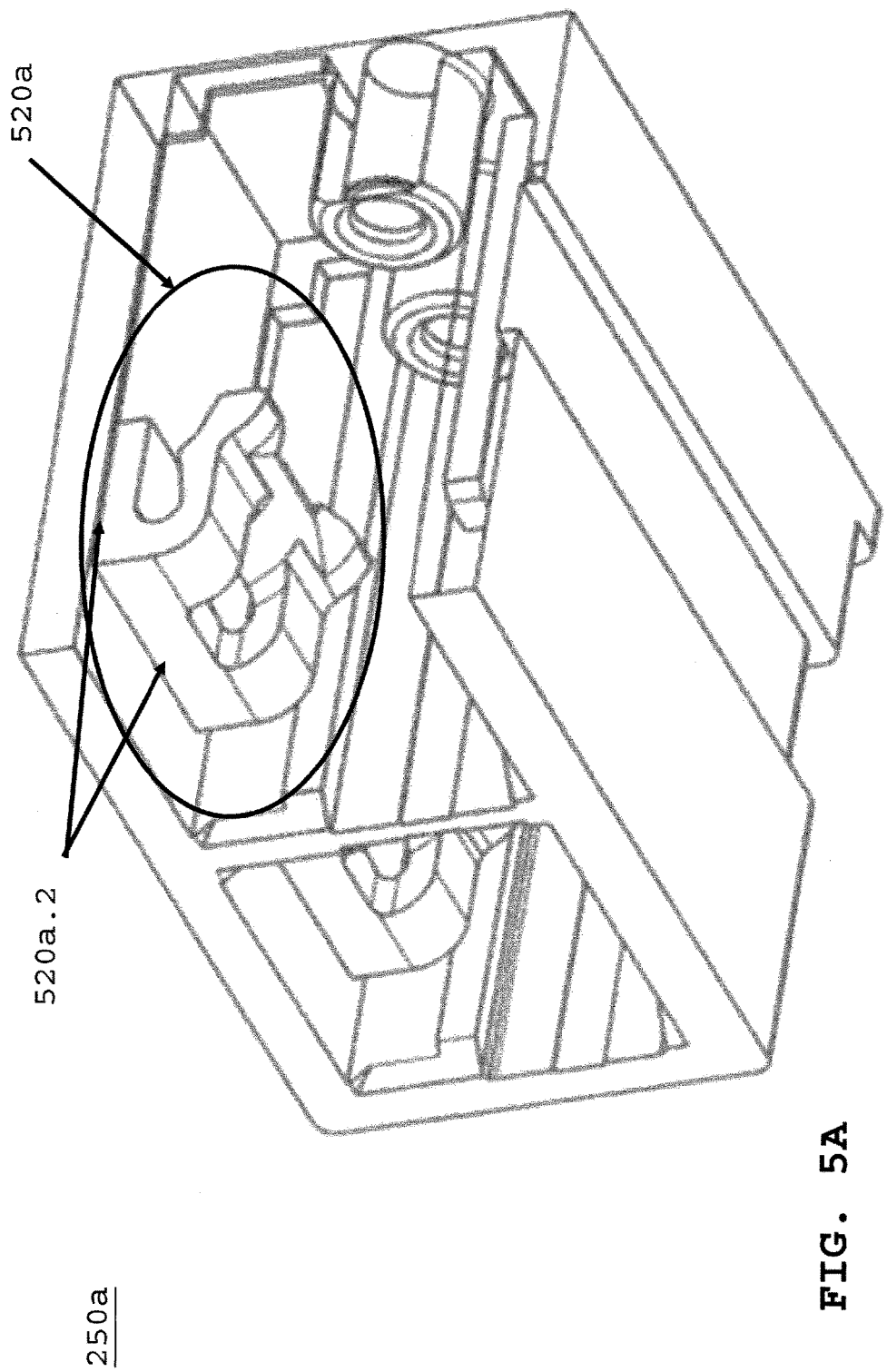
FIG. 5A is a cross-sectional perspective front view from a plane cutting along B-B' of FIG. 2B illustrating engagement device molded into inner adapter housing.
Figure 5B:
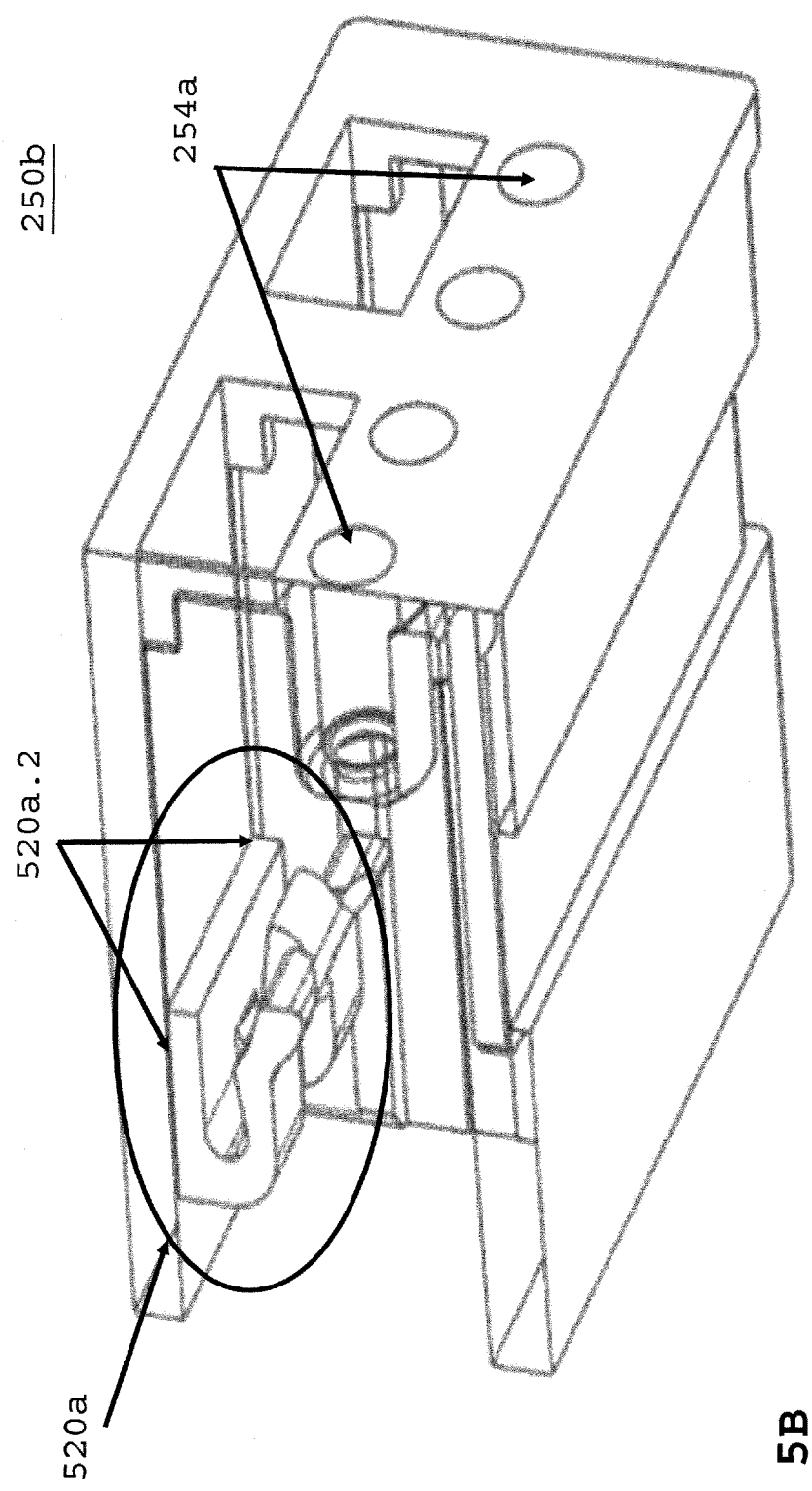
FIG. 5B is a cross-sectional perspective view from a plane cutting along B-B' of FIG. 2B illustrating engagement device molded into inner adapter housing at a distal end of first body portion of adapter FIG. 2A.

FIG. 5A is cross-sectional B-B' of first body portion 250a depicting an integrated engagement device 520a, which is a molded as one piece within the inner housing as shown along sides 520a.2 of engagement device 520a, to inner surface 675 (refer to FIG. 6B) of adapter housing 110. Referring to FIG. 5B, cross-sectional B-B' of the first body portion 250a depicts integrated engagement device 520a, which is molded as one-piece within inner adapter housing as shown along sides 502a.2 of engagement device 520a, to inner surface 675 of adapter housing 110. The corresponding alignment sleeve openings 254a at a distal end of first body portion accept an end of alignment sleeves 114a to secure first and second body portion as a single adapter. A second end of alignment sleeves 114a are accepted into corresponding alignment sleeve openings 254b. The two portions are pushed together along a longitudinal axis of the sleeves 114a to secure first and second body portions together. The engagement device 120 may be ultrasonic welded to an inner housing of the adapter without departing from the scope of the invention.

FIG. 6A is a front view of adapter 200 with a cross-section along A-A along a longitudinal axis from a first end to a second end of an adapter or transceiver receptacle. FIG. 6B is a cross-section along A-A shows the engagement device 520a molded as part of inner housing 675 of adapter 400 at a first end, as shown in cross-section. FIG. 8A is a front view of adapter 200 as shown in FIG. 6A. FIG. 8B is a cross-section along A-A integrated engagement devices (520a, 520b) molded as part of inner housing 675 of adapter 200 at either end, as shown at cross-section. The alignment sleeve 855 secures first body portion 250a and second body portion 250b to form adapter 200.

Figure 9A:
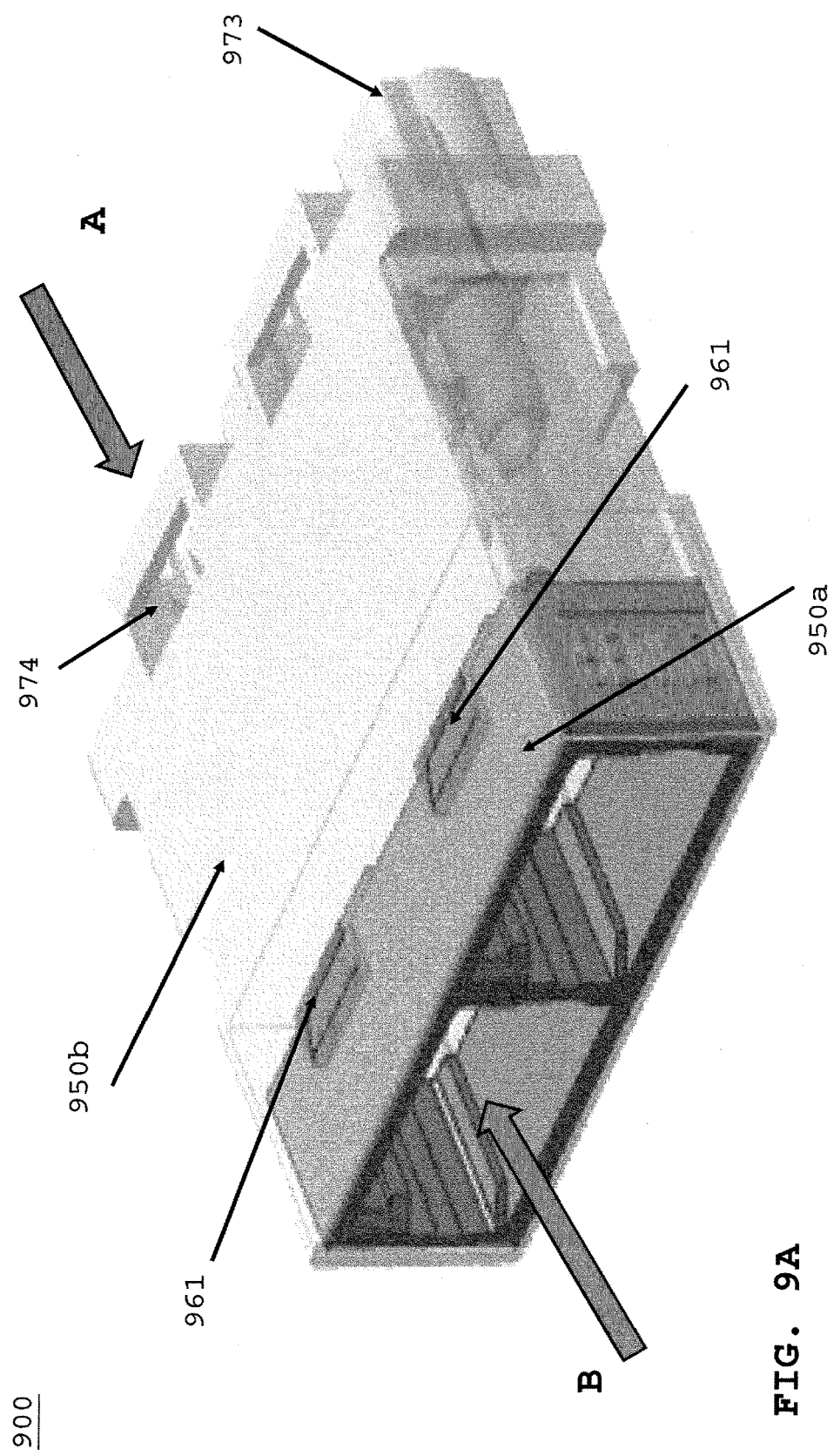
FIG. 9A is a perspective view of another embodiment of multi-body adapter with an integrated engagement device.

FIG. 9A depicts another embodiment of two-piece adapter 900. First body portion 950a detaches via latches 961 from second body portion 950b. A connector 130 is inserted in direction of arrow "A", and connector 140 is inserted in direction of arrow "B". This embodiment replaces the alignment sleeves securing the two body portions, as shown in FIG. 7B, with one or more latches. FIG. 9A.1 depicts first body portion 950a removed from second body portion 950b, FIG. 9A.2. A pair of latches 961 are secured in openings 972 when first body portion is pushed into second body portion along direction of the dashed arrow. The second body portion can accept connector 140 within shroud 937, at second end 938b of assembled adapter. Connector 140 ferrule openings 147, FIG. 1F, engage alignment sleeve holders 975 and outer housing 144 engages inner housing of shroud 937. This aligns connector 140, so latch 142 is accepted into opening 974, and secures connector 140 into adapter receptacle. First end 938a accepts connector 130, and as a result of the above description two connectors are in communication along a longitudinal axis of adapter 900.

Figure 10B:
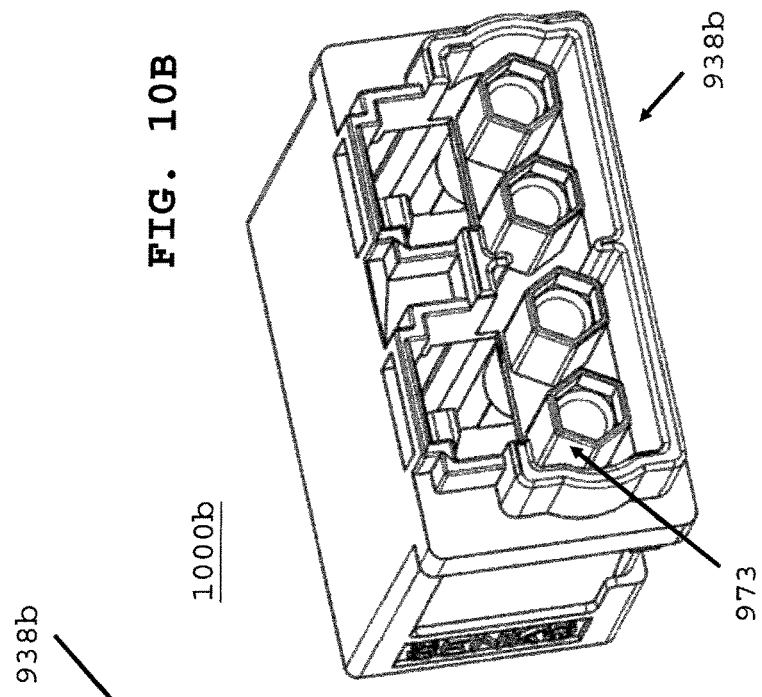
FIG. 10B is a rear perspective angled view of a second body portion of the multi-body adapter of FIG. 2A.
Figure 10A:
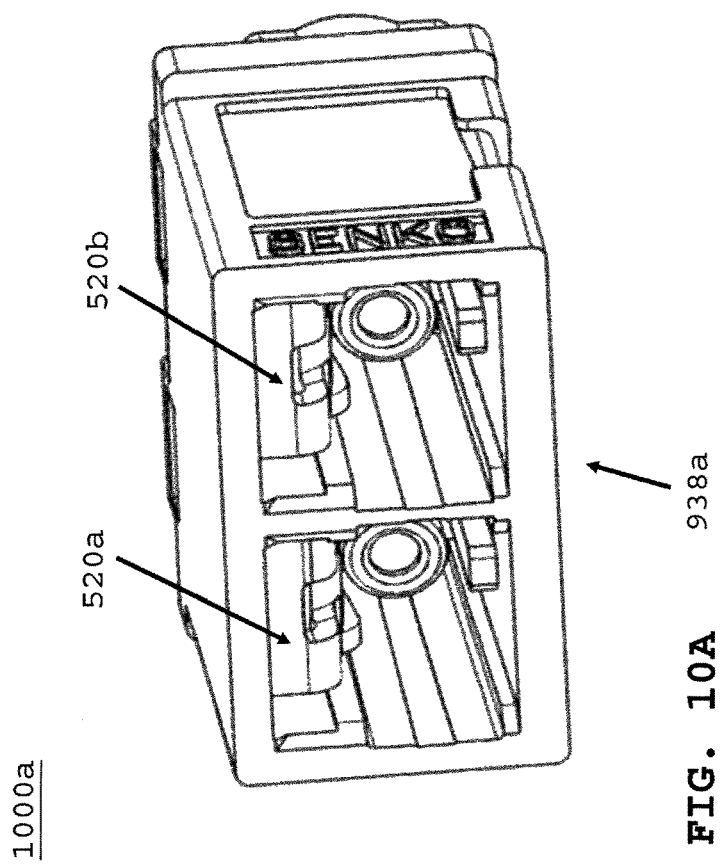
FIG. 10A is a front perspective angled view of a first body portion of the multi-body adapter of FIG. 2A.

Referring to FIG. 10A, adapter 200 shows engagement devices (520a, 520b) in respective receptacles at first end 938a. FIG. 10B is a rear view of second end of second body portion showing corresponding structure that can mate with connector 140. FIG. 11A depicts front view of adapter 200 showing gap 113 as extra space within adapter housing when using integrated adapter devices (220a, 220b), and cross section along C-C' depicted in FIGS. 12-13B. The additional space may be used to increase material thickness to improve adapter durability, or reduce adapter size to correspond to future size reductions in connectors.

Figure 12:
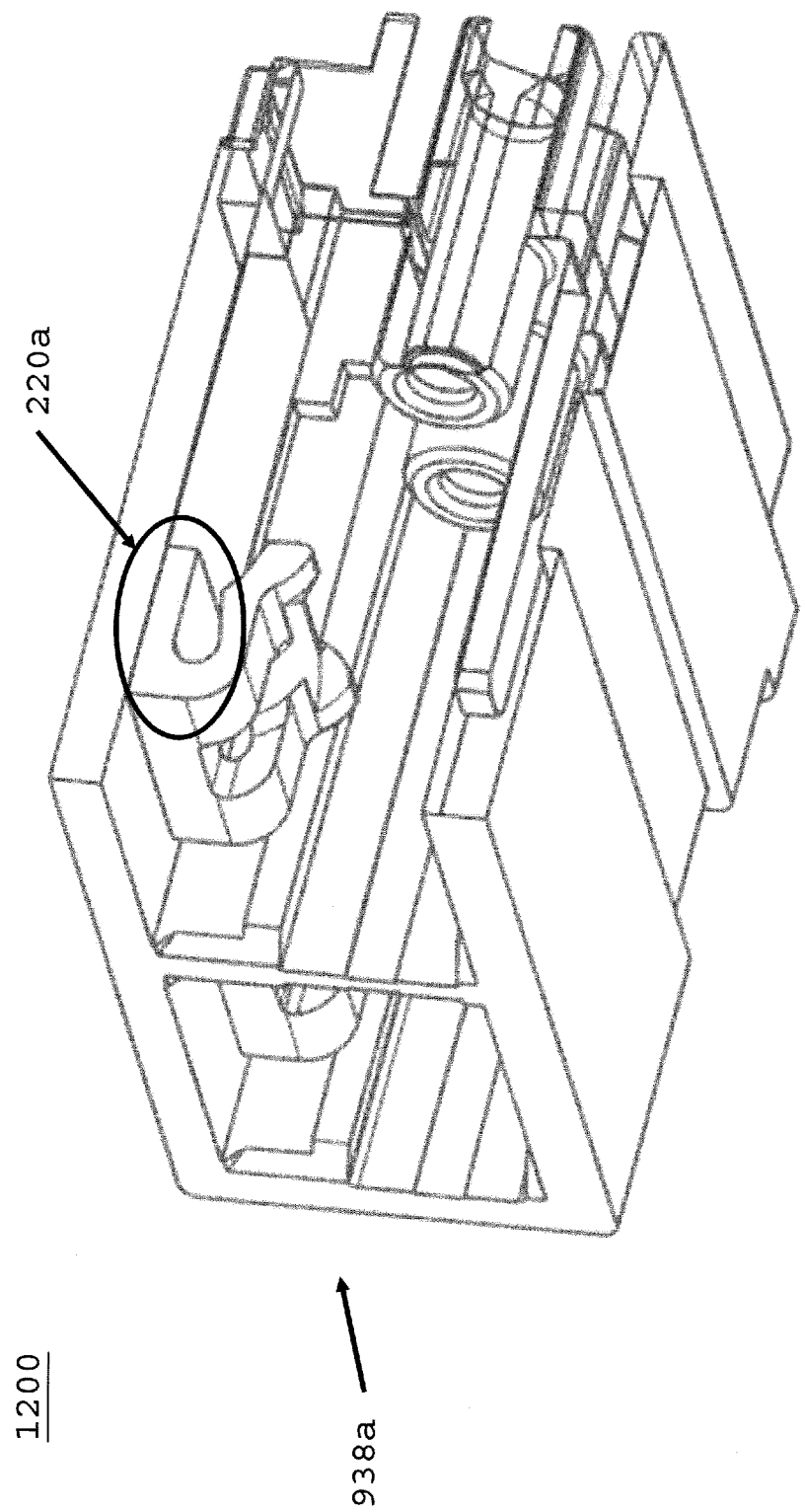
FIG. 12 is a cross-sectional perspective angled front view along plane C-C' of FIG. 11A.

FIG. 11B depicts a distal end of engagement devices (220a.1, 220b.1) as seen along longitudinal axis of adapter 200. The longitudinal axis is from a first end to a second end along bi-directional arrow "A" of FIG. 2A. FIG. 12 depicts engagement device 120 molded into adapter inner housing, as shown in call-out 220a, at first end 938a of first body portion. FIG. 13A depicts engagement device 220a molded into adapter housing as viewed from its distal end. FIG. 13B depicts engagement device molded into inner housing as viewed from backside of engagement device 220a.1 of adapter at second end 938b of adapter.

Figure 14:
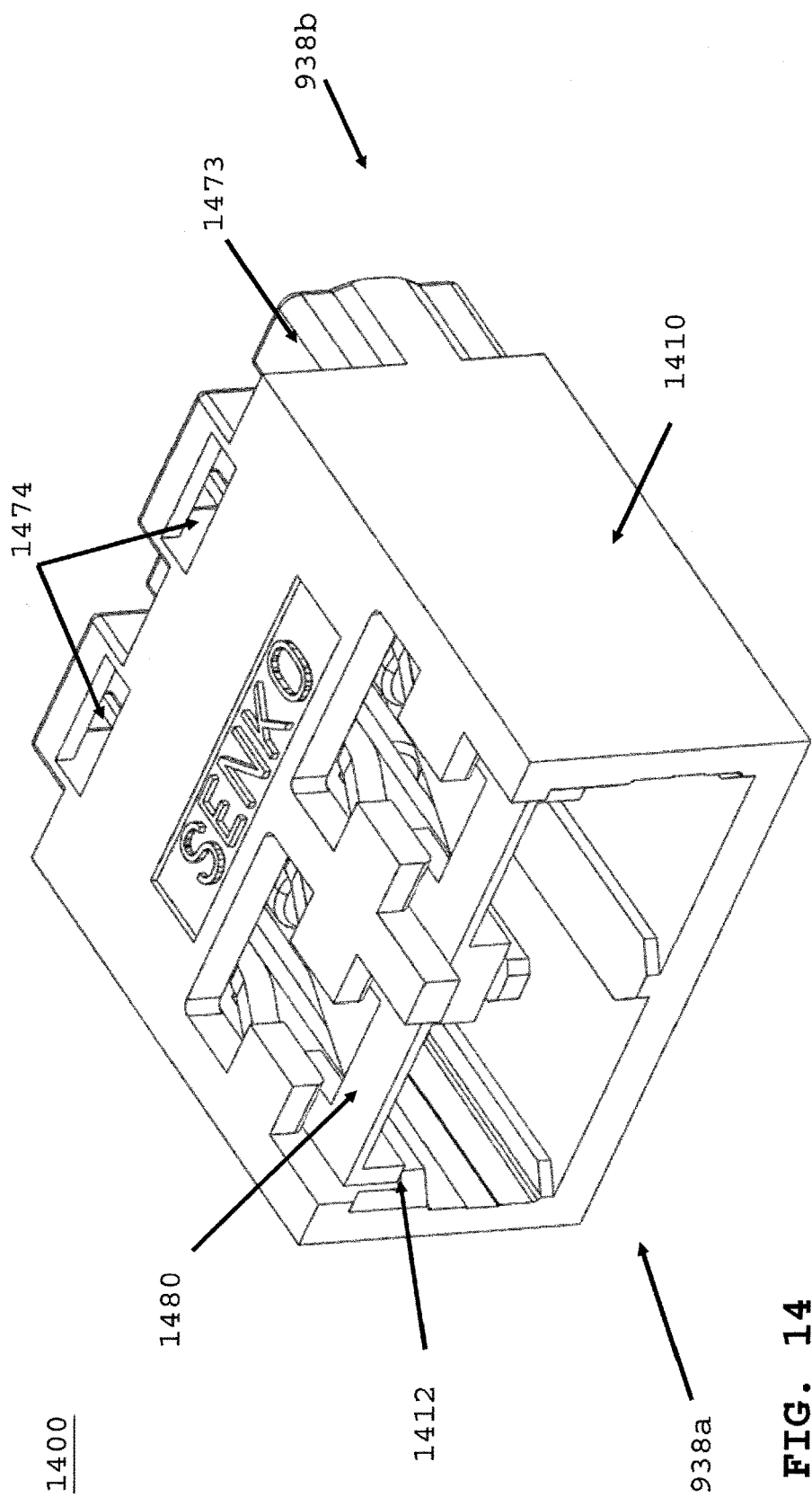
FIG. 14 is front perspective view of adapter with unitary engagement device therein.

FIG. 14 depicts a single housing adapter with a unitary engagement device removable and replaceable within a first end 938a of adapter. The second end 938b is configured to accept connector 140, with latch 142 being accepted into openings 1474 to secure connector within shroud 1473, thereby establishing a communication path from a second end to a first end of adapter. Without departing from the scope of the invention, the second end 938a can be configured to accept the unitary device 1480, while the first end is configured to accept connector 140. Also, first and second ends can both accept the unitary device 1480, as shown in FIG. 8B that has an engagement device 220a, 220b molded as part of adapter inner housing at either end of adapter.

Figure 16A:
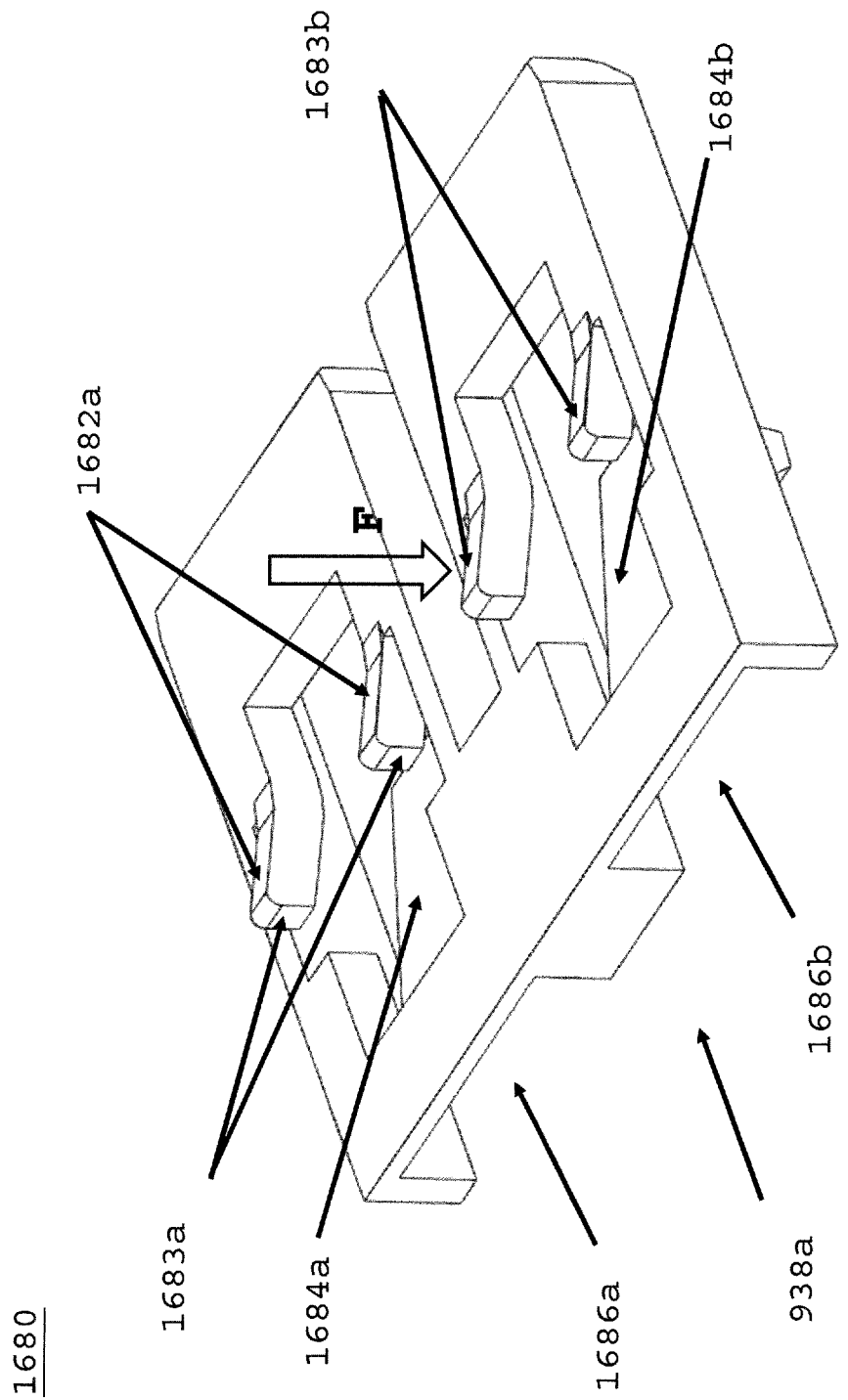
FIG. 16A is a perspective view of the engagement device of FIG. 15A showing operation of protrusions under a force "F" created by insertion into an adapter receptacle.
Figure 16B:
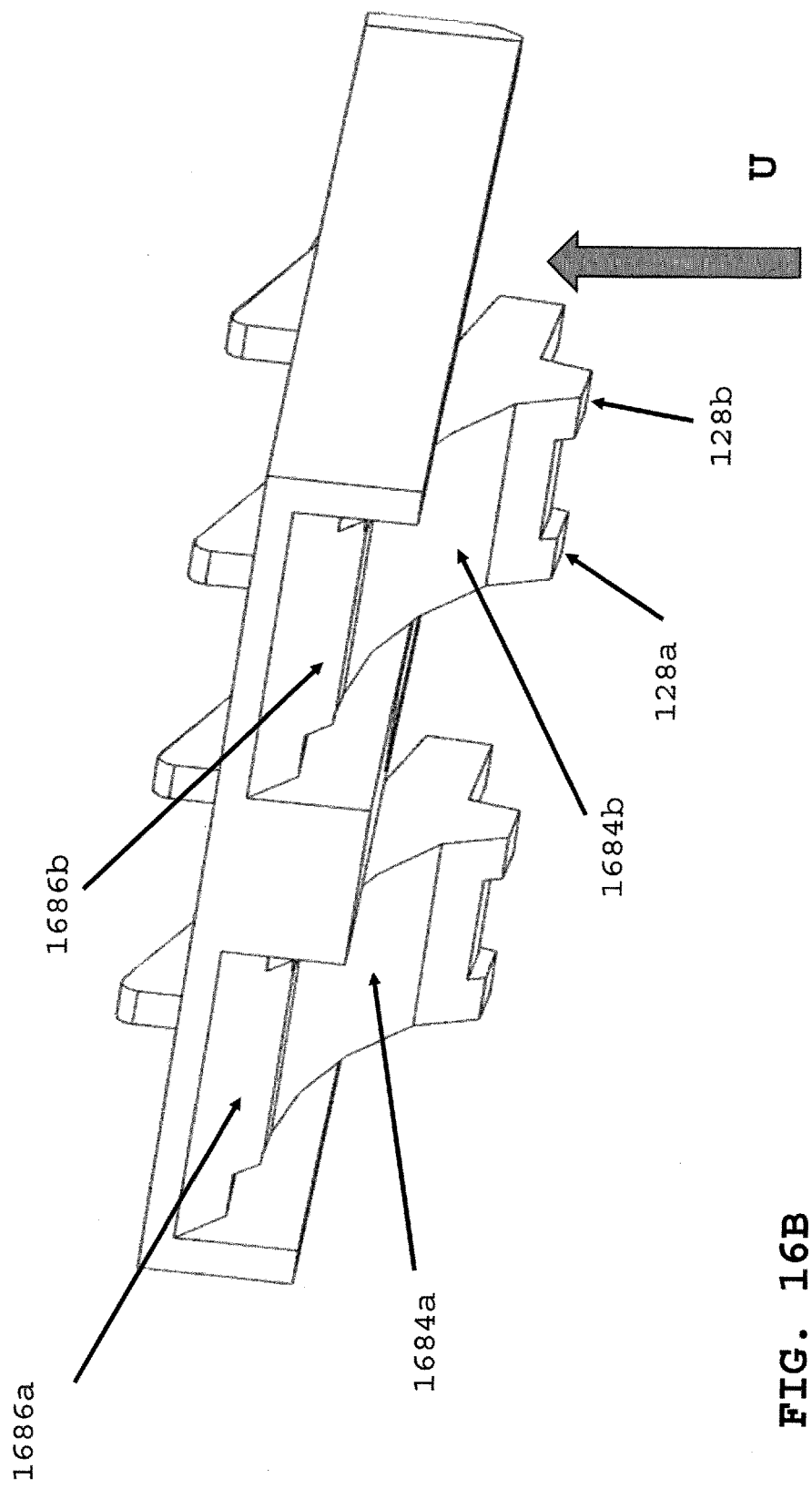
FIG. 16B is a perspective view of bottom of the engagement device of FIG. 15A.

FIG. 15A depicts unitary engagement device 1480 prior to insertion into a first end of adapter housing 1510 (refer to FIG. 15B). As with a replaceable engagement device 120a, guide rails 129 are aligned with and accepted by rail support 112 within a receptacle, as shown by dotted arrow (refer to FIG. 15B). Referring to FIG. 16A, the unitary engagement device further comprises a plural of flexible latches (1683a, 1683b) for each engagement device. A single latch may be provided to secure device 1480 within an adapter receptacle. Upon insertion of unitary device 1480 into one end of adapter as shown in direction of arrow "A", FIG. 15A, face 1682a of latch pair 1683a engages adapter inner housing, and latches 1683a and 1683b are pushed down in arrow direction "F". Upon complete insertion, the latch pair (1683a, 1683b) secures unitary engagement device via adapter housing openings (939a, 939b) respectively. Upon insertion of connector 130 into a receptacle of adapter, widthwise recess 132 accepts flexible tab (1684a or 1684b) and connector 130 is secured within a receptacle. Proximal end of connector 130 is placed within openings (1686a, 1686b). Referring to FIG. 16B, connector 130 is inserted into opening 1686b. The proximal end raises flexible tab 1684b, and arms (128a, 128b) are seated in widthwise recess 132 to secure connector 130 within adapter. To release connector 130, push/pull tab is moved forward, and middle arm 124 lifts flexible tab upward, in direction of arrow "U", removing arms from widthwise recess 132, so connector 130 can be removed.

FIG. 17 depicts connector 130 secured in first end of adapter 140 and connector 140 secured in second end of adapter 140. A two-piece adapter 200 may be used without departing from the scope of the invention. The unitary engagement device 1480 is inserted into a first end of first body portion, or a first end contains corresponding integrated engagement devices (220a, 220b).

An ordinarily skilled person in the art can appreciate that by following the principal of the present invention, a version of the adapter for mating a multi-fiber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic adapter comprising:
a housing having a first end and a second end with one or more receptacles for receiving a connector,
each receptacle further comprises an integrated engagement device for securing the connector,
the integrated engagement device is formed as part of the receptacle,
the integrated engagement device further comprises a middle arm and two or more outer arms, and
wherein the middle arm lifts the outer arms when the middle arm is lifted by the connector inserted into the receptacle having the engagement device.

2. The fiber optic adapter of claim 1, wherein the two or more outer arms are received in a widthwise recess on surface of a connector.

3. The fiber optic adapter of claim 2, wherein the widthwise recess is a groove.

4. The fiber optic adapter of claim 1, wherein the integrated engagement device is molded as part of an inner housing of the receptacle.

5. The fiber optic adapter of claim 1, wherein the engagement device is ultrasonic welded to an inner housing of the receptacle.

6. The fiber optic adapter of claim 1, wherein a second end of the adapter receives a multi-fiber optic ferrule connector further comprising a latch on an outer housing of the connector, the latch is secured in an opening of the adapter housing.

7. A fiber optic adapter comprising:
a housing having a first body portion and a second body portion;
the first and second body portions are detachable;
the first body portion has one or more receptacles;
the receptacle further comprises an integrated engagement device therein for securing a connector,
the integrated engagement device further comprises a middle arm and two or more outer arms, and
wherein the middle arm lifts the outer arms when the middle arm is lifted by the connector inserted into the receptacle having the engagement device.

8. The fiber optic adapter of claim 7, wherein the integrated engagement device is molded as part of an inner housing of the receptacle.

9. The fiber optic adapter of claim 7, wherein the engagement device is ultrasonic welded to an inner housing of the receptacle.

10. The fiber optic adapter of claim 7, wherein a second end of the adapter receives a multi-fiber optic ferrule connector further comprising a latch on an outer housing of the connector, the latch is secured in an opening of the adapter housing.

11. The fiber optic adapter of claim 7, wherein the connector has a recess on a side to accept engagement device for securing connector within receptacle.

12. A fiber optic adapter comprising:
a housing having a first end and a second end;
the first or second end having a plural of receptacles;
a first receptacle at the first end further comprising an integrated engagement device for securing a multi-fiber optic connector therein;
a second receptacle further comprising an opening on a side, the opening accepts a latch on an outer housing of a multi-fiber optic ferrule connector for securing the multi-fiber optic ferrule connector therein;
the integrated engagement device further comprises a flexible tab and two or more arms, and
wherein the flexible lifts the arms when the flexible tab is lifted by the connector inserted into the receptacle having the engagement device.

13. The fiber optic adapter of claim 12, wherein the housing comprises a first portion and a second portion separating the first end from the second end.

14. The fiber optic adapter of claim 13, wherein the first and the second portion are secured using clips.

* * * * *